United States Patent
Fritz

(10) Patent No.: US 10,506,000 B2
(45) Date of Patent: Dec. 10, 2019

(54) MESH CONFERENCING

(71) Applicant: ShoreTel, Inc., Sunnyvale, CA (US)

(72) Inventor: Kent A. Fritz, Mountain View, CA (US)

(73) Assignee: Mitel Networks, Inc. DE (US)

( * ) Notice: Subject to any disclaimer, the term of this patent is extended or adjusted under 35 U.S.C. 154(b) by 297 days.

(21) Appl. No.: 15/613,812

(22) Filed: Jun. 5, 2017

(65) Prior Publication Data

US 2017/0272479 A1   Sep. 21, 2017

Related U.S. Application Data

(63) Continuation of application No. 14/265,004, filed on Apr. 29, 2014, now Pat. No. 9,674,242, which is a continuation-in-part of application No. 13/536,576, filed on Jun. 28, 2012, now Pat. No. 8,861,510.

(51) Int. Cl.
| | |
|---|---|
| *H04W 4/00* | (2018.01) |
| *H04L 29/06* | (2006.01) |
| *H04L 12/44* | (2006.01) |
| *H04L 12/64* | (2006.01) |

(52) U.S. Cl.
CPC .......... *H04L 65/4038* (2013.01); *H04L 12/44* (2013.01); *H04L 12/6418* (2013.01); *H04L 65/1006* (2013.01); *H04L 65/1069* (2013.01); *H04L 65/1093* (2013.01)

(58) Field of Classification Search
None
See application file for complete search history.

(56) References Cited

U.S. PATENT DOCUMENTS

| | | | |
|---|---|---|---|
| 6,731,609 B1 * | 5/2004 | Hirni | H04L 12/1813 370/260 |
| 7,379,540 B1 | 5/2008 | Gundy | |
| 7,450,574 B1 | 11/2008 | Miller et al. | |
| 7,924,823 B2 | 4/2011 | Miller et al. | |
| 7,990,953 B2 | 8/2011 | Cheng et al. | |
| 8,159,935 B1 | 4/2012 | Fritz | |
| 8,214,518 B1 | 7/2012 | Bertz | |
| 8,359,354 B1 | 1/2013 | Do et al. | |

(Continued)

OTHER PUBLICATIONS

Final Office Action dated Apr. 9, 2014 for U.S. Appl. No. 13/536,576, 20 pages.

(Continued)

*Primary Examiner* — Zewdu A Beyen

(57) ABSTRACT

A system for mesh conferencing using Session Initiation Protocol (SIP) signaling includes at least three endpoints communicatively coupled to each other via media paths. The media paths are for exchanging media communications between the at least three endpoints. At least one controller is communicatively coupled to each of the at least three endpoints via control paths separate from the media paths. The control paths are for exchanging SIP messages to setup the media communications between the at least three endpoints as a mesh conference. Upon establishment of the mesh conference, each of the at least three endpoints may be configured to send a media stream via one of the media paths to each of the others of the at least three endpoints and to receive a media stream via one of the media paths from each of the others of the at least three endpoints.

12 Claims, 32 Drawing Sheets

(56) References Cited

U.S. PATENT DOCUMENTS

| | | |
|---|---|---|
| 8,861,510 B1 | 10/2014 | Fritz |
| 8,982,902 B1 | 3/2015 | Naganathan et al. |
| 2003/0005054 A1 | 1/2003 | Ei-Gebaly et al. |
| 2005/0232238 A1 | 10/2005 | Oran |
| 2006/0025141 A1 | 2/2006 | Marsh et al. |
| 2006/0039389 A1 | 2/2006 | Burger et al. |
| 2006/0098668 A1 | 5/2006 | Dona |
| 2006/0203750 A1* | 9/2006 | Ravikumar ........... H04L 63/102 370/261 |
| 2009/0034700 A1 | 2/2009 | Brunson et al. |
| 2011/0216701 A1 | 9/2011 | Patel et al. |
| 2012/0152153 A1 | 6/2012 | Gong et al. |
| 2013/0159424 A1 | 6/2013 | Georg et al. |
| 2013/0279669 A1 | 10/2013 | Minert |
| 2014/0214975 A1 | 7/2014 | Nicolas |

OTHER PUBLICATIONS

Non-Final Office Action dated Jan. 9, 2014 for U.S. Appl. No. 13/536,576, 18 pages.
Notice of Allowance dated Feb. 14, 2017 for U.S. Appl. No. 14/265,004.
Notice of Allowance dated Jul. 9, 2014 for U.S. Appl. No. 13/536,576.
Notice of Allowance dated Oct. 18, 2014 for U.S. Appl. No. 13/536,832.
Office Action dated Apr. 17, 2014 for U.S. Appl. No. 13/536,832.
Office Action dated Jun. 9, 2016 for U.S. Appl. No. 14/265,004.
Office Action dated Oct. 1, 2015 for U.S. Appl. No. 14/265,004.
Office Action dated Sep. 8, 2014 for U.S. Appl. No. 13/536,832.

* cited by examiner

MESH CONFERENCING

CROSS-REFERENCE TO RELATED APPLICATIONS

The present application is a continuation of U.S. patent application Ser. No. 14/265,004, filed Apr. 29, 2014 and entitled "MESH CONFERENCING", which was a continuation-in-part of U.S. patent application Ser. No. 13/536,576, filed Jun. 28, 2012, the entire contents of which are incorporated herein by reference for all purposes.

BACKGROUND

The present disclosure relates generally to routing communications between entities over one or more telecommunication networks. In particular, the present disclosure relates to Internet Protocol (IP) and the use of a media proxy in a Voice over IP (VoIP) system.

A telecommunications network generally includes a collection of terminals, links, and nodes, which connect together to enable communication between users of the terminals. There are many examples of telecommunications networks, for example, computer networks, the Internet, the telephone network, and others. Messages associated with communications are generated by a transmitting or sending terminal, which are routed through one or more networks of links and nodes until they arrive at a destination terminal. The intermediate nodes handle the messages and route them across the correct link toward their final destination. The messages typically consist of control (or signaling) portions and media portions, which may be sent together or separately. The control (or signaling) portion carries instructions for the nodes on where and how to route the message through one or more networks. The media includes the actual content that the user wishes to communicate or transmit (e.g., encoded speech, encoded audio, encoded video or an email).

Over the years, a number of protocols have been developed to specify how each different type of telecommunication network should handle the control and media portions to accomplish routing efficiently. One such protocol is Session Initiation Protocol (SIP), which is an IP telephony text-based signaling protocol suitable for integrated voice/data applications.

In typical SIP architectures, SIP signaling (or control) and Real-time Transport Protocol (RTP) media follow different paths, and the control elements responsible for call-setup and features do not have access to the RTP media. Several architectures insert a media proxy into the RTP media path, during call setup, for the purposes of monitoring or manipulating the media.

Session Description Protocol (SDP), described in IETF RFC4733, describes multimedia sessions for the purposes of session announcement, session invitation, and other forms of multimedia session initiation. SDP is used from VOIP signaling protocols like SIP, H.323 and some minor VOIP protocols to transfer media setup information about a multimedia client from one point A to another point B.

Voice over IP (VoIP) is an architecture that encompasses many protocols, each of which are used for some form of signaling of call capabilities and transport of voice data from one point to another.

Existing architectures with a media proxy do not effectively utilize resources, thereby incurring increased costs, poor quality of calls due to increased latency, and offering features that do not address all user needs.

With the ongoing trends and growth in telecommunications, it would certainly be beneficial to find better ways to improve telecommunication schemes, by lowering costs, increasing call quality, and introducing enhanced features for users that do not currently exist.

SUMMARY

In some embodiments, the system architecture and methods that are disclosed provide a media proxy configured to be inserted dynamically into a VoIP-enabled system, as-needed, either during call setup or during a call, that is, in the middle of the call. In either case, the media proxy is invoked in response to a particular feature that requires the media proxy. This dynamic media proxy configuration facilitates many advantages, including lower cost because the media proxy is utilized only when needed, therefore, for fewer calls, rather than unnecessarily for all calls.

In some embodiments of the system architecture and methods, the media proxy is configured to be inserted during set up of a call, in order to 1) capture DTMF (dual-tone multi-frequency) signals generated during the call, 2) enable communication between devices that do not share a common codec, 3) insert tones, 4) simplify signaling operations, and 5) permit elements that require a late session description to talk to elements that require an early session description.

In other embodiments of the system architecture and methods, the media proxy is configured to be inserted when a call is in progress, for example, also, 1) to capture DTMF (dual-tone multi-frequency) signals, 2) insert tones or other media such as "music-on-hold," 3) record the media, and 4) create conference calls for devices that do not provide conferencing capabilities, and provide features, for example, "silent monitor," "silent coach," "barge in," or the like.

In some embodiments of the system architecture, the present technology is directed to a telephony system architecture for a VoIP-enabled system, comprising at least two communication devices for exchanging a communication, at least one controller for conveying control signals via a control path for setup of the communication and a session initiation protocol trunk for establishing the communication, and comprising a media proxy configurable for dynamic insertion either during a setup phase of the communication or while the communication is in progress, the dynamic insertion responsive to a particular feature that requests the media proxy.

In some embodiments, a method for transmitting communications via a VoIP system, including at least two communication devices, at least one controller for conveying control signals via a control path for setup of the communications and a session initiation protocol trunk for establishing the communications, comprises, dynamically inserting a media proxy only during a setup phase of the communications or while the communications are in progress, responsive to a particular feature that requests the media proxy.

In some embodiments, the system architecture and methods that are disclosed provide mesh conferencing for calls that are set up using SIP signaling. A mesh conference is one in which no one party is responsible for mixing media for another party. Mesh conferencing distributes the load amongst endpoints allowing use of lower-power central processing units (CPU's). Mesh conferencing also reduces latency by sending media streams from each endpoint directly to all other endpoints that are participating in a conference.

In some embodiments, a system for mesh conferencing using SIP signaling includes at least three endpoints communicatively coupled to each other via media paths. The media paths are for exchanging media communications between the at least three endpoints. At least one controller is communicatively coupled to each of the at least three endpoints via control paths that are separate from the media paths. The control paths are for exchanging SIP messages to setup the media communications between the at least three endpoints as a mesh conference. Upon establishment of the mesh conference, each of the at least three endpoints is configured to send a media stream to each of the others of the at least three endpoints via the media paths and to receive a media stream from each of the others of the at least three endpoints via the media paths.

In some embodiments, a method for establishing a mesh conference using SIP signaling includes establishing the mesh conference between a first endpoint, a second endpoint, and a third endpoint using SIP signaling. During the mesh conference, the first endpoint receives media streams from the second endpoint and the third endpoint and mixes the media streams for output at the first endpoint; the second endpoint receives media streams from the first endpoint and the third endpoint and mixes the media streams for output at the second endpoint; and the third endpoint receives media streams from the first endpoint and the second endpoint and mixes the media streams for output at the third endpoint.

In some embodiments, a method for joining a telephone call between a first endpoint and a second endpoint using SIP signaling includes sending a SIP INVITE message with a call feature parameter from a third endpoint to the second endpoint; sending a SIP REFER message with a Join parameter, a Mesh parameter, and the call feature parameter from the second endpoint to the third endpoint; and sending a SIP INVITE message with the Join parameter, the Mesh parameter, and the call feature parameter from the third endpoint to the first endpoint. After joining the call, the first endpoint receives a media stream from the second endpoint for output at the first endpoint; the second endpoint receives a media stream from the first endpoint for output at the second endpoint; and the third endpoint receives media streams from the first endpoint and the second endpoint and mixes the media streams for output at the third endpoint.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

Figure 1:
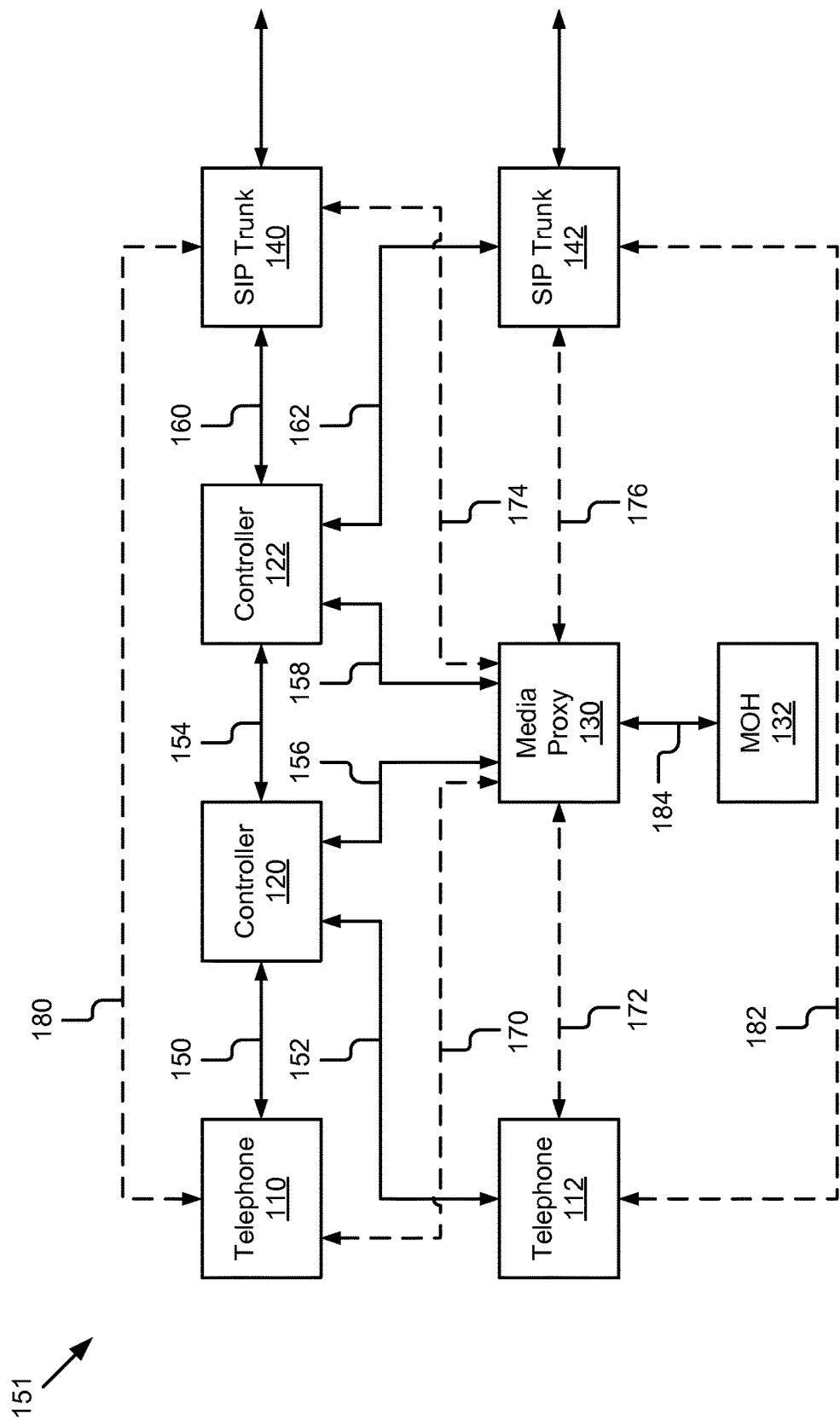
FIG. 1 is a block diagram of a VoIP system illustrating its components including the dynamic media proxy according to some embodiments.

In some embodiments, the system architecture and methods provide a media proxy configured to be inserted dynamically into a VoIP system, as-needed, either during call setup or during a call; in either case, only by invocation of a particular feature that requires the media proxy. This "dynamic" media proxy facilitates many advantages, including lower cost, because the media proxy is utilized only when needed, therefore, for fewer calls, rather than unnecessarily for all calls. By avoiding the proxy of media when not needed, the latency of the media is reduced, which results in better perceived call-quality.

In the following description, for purposes of explanation, numerous specific details are indicated in order to provide a thorough understanding of the technology described. It should be apparent, however, to one skilled in the art, that this technology can be practiced without these specific details. In other instances, structures and devices are shown in block diagram form in order to avoid obscuring the technology. For example, the present technology is described with some embodiments below with reference to user interfaces and particular hardware. However, the present technology applies to any type of computing device that can receive data and commands, and any devices providing services.

Reference in the specification to "one embodiment," "an embodiment," or "some embodiments" means simply that one or more particular features, structures, or characteristics described in connection with the one or more embodiments is included in at least one or more embodiments that are described. The appearances of the phrase "in one embodiment" in various places in the specification are not necessarily all referring to the same embodiment.

Some portions of the detailed descriptions that follow are presented in terms of method algorithms and symbolic representations of telecommunication operations on data bits within a computer memory of either one or more computing devices typically used in telecommunications. These algorithmic descriptions and representations are the means used by those skilled in the data processing and telecommunication arts to most effectively convey the substance of their work to others skilled in the art. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms such as "processing," "computing," "calculating," "determining," "transmitting," or "displaying" or the like, refer to the action and processes of a computer device or system or similar electronic computing device used in telecommunications, that manipulates and transforms data represented as physical (electronic) quantities within the computer device or system's registers and memories into other data similarly represented as physical quantities within the computer system memories or registers or other such information storage, transmission, or display devices.

The present technology also relates to system architecture for performing the operations described here. This system architecture may be specially constructed for the required purposes or methods stated here, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This telecommunication technology may take the form of an entirely hardware embodiment, an entirely software embodiment, or an embodiment including both hardware and software components. In some embodiments, this technology is implemented in software, which includes but is not limited to firmware, resident software, microcode, etc.

Furthermore, at least portions of this telecommunication technology may take the form of one or more computer program products accessible from a computer-usable or computer-readable medium providing program code for use by or in connection with a computer or any instruction execution system. For the purposes of this description, a computer-usable or computer-readable medium may be any apparatus that can include, store, communicate, propagate, or transport the program for use by or in connection with the instruction execution system, apparatus, or device. The components used in telecommunication systems and networks may use a data processing system suitable for storing and/or executing program code including at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) may be coupled to the system architecture either directly or through intervening I/O controllers.

Communication units including network adapters may also be coupled to the systems to enable them to couple to other data processing systems or storage devices, through either intervening private or public networks. Modems, cable modems, and Ethernet cards are just a few examples of the currently available types of network adapters.

Finally, the algorithms and operations presented in this telecommunication application are not inherently related to any particular computer or other telecommunications apparatus. Various general-purpose telecommunication systems may be used or modified with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

The present technology is now described more fully with reference to the accompanying figures, in which several embodiments of the technology are shown. The present technology may be embodied in many different forms and should not be construed as limited to the embodiments set forth herein. Rather, these embodiments are provided so that this disclosure will be thorough and complete and will fully convey the invention to those skilled in the art.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

This technology relates to telecommunications networks, in particular, which relate to Voice over Internet Protocol (VoIP) systems. Various embodiments and features of the new technology developed here are described in this environment. In a telecommunications network, control messages are conveyed between elements along control paths of one or more telecommunication networks, and media content is conveyed between elements along media paths of the networks.

Some Embodiments of VoIP Systems with a Dynamic Media Proxy

FIG. 1 is a high-level block diagram illustrating some embodiments of a VoIP system having a dynamic media proxy. The system 151 illustrated in FIG. 1 provides an architecture for invoking dynamic media proxy capabilities only when needed. The media proxy is a server that directs callers initiating communication to correct destinations while maintaining the quality of the communication and the data being transmitted. The media proxy also serves to generate and provide detailed communication records, information on duration of communications, communication destinations etc.

FIG. 1 through FIG. 4 are simplified block diagrams illustrating various embodiments of VoIP systems, depicting some elements (components, functional modules, entities and the like) and related operations involved in setting up calls. If any elements are omitted, it should be recognized that they may be only for purposes of illustrating the technology with clarity. Generally, the elements that are shown here include telephones, controller(s), one or more media proxies, and session initiation protocol (SIP) trunks. These elements are generally illustrated by rectangular boxes or blocks. Solid lines extending between elements that are illustrated represent control (or signaling) paths. Dashed lines extending between elements represent media (or content) paths. "Paths" may also be referred to as "links." The SIP trunks provide connectivity with one or more external telephone networks (not shown). Various arrangements and groupings of the elements are shown, as described in greater detail below.

Figure 2:
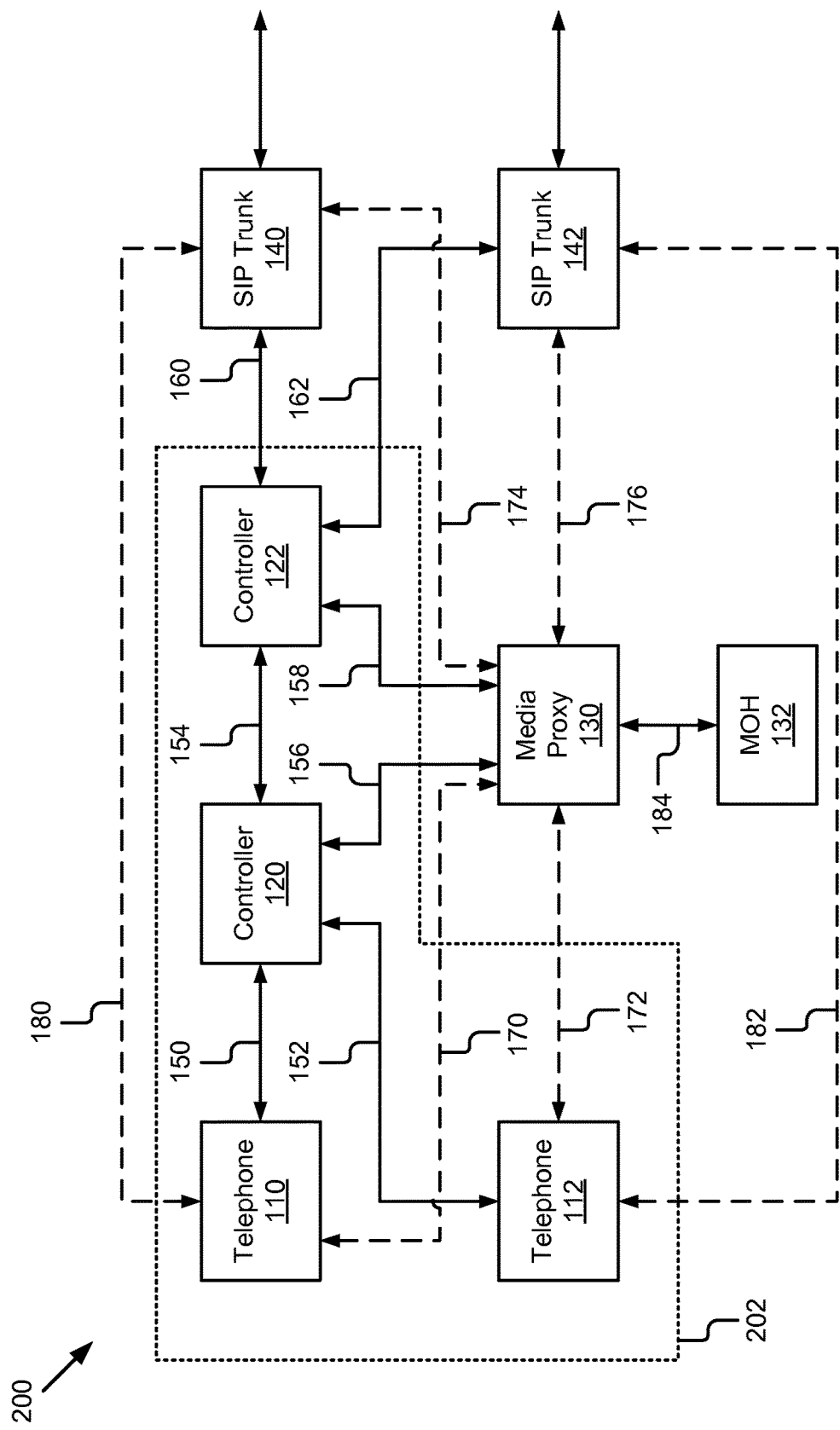
FIG. 2 is a block diagram of the VoIP system illustrating a configuration of components indicated within broken lines and referenced by numeral 202, and the dynamic media proxy external to the VoIP system.
Figure 3:
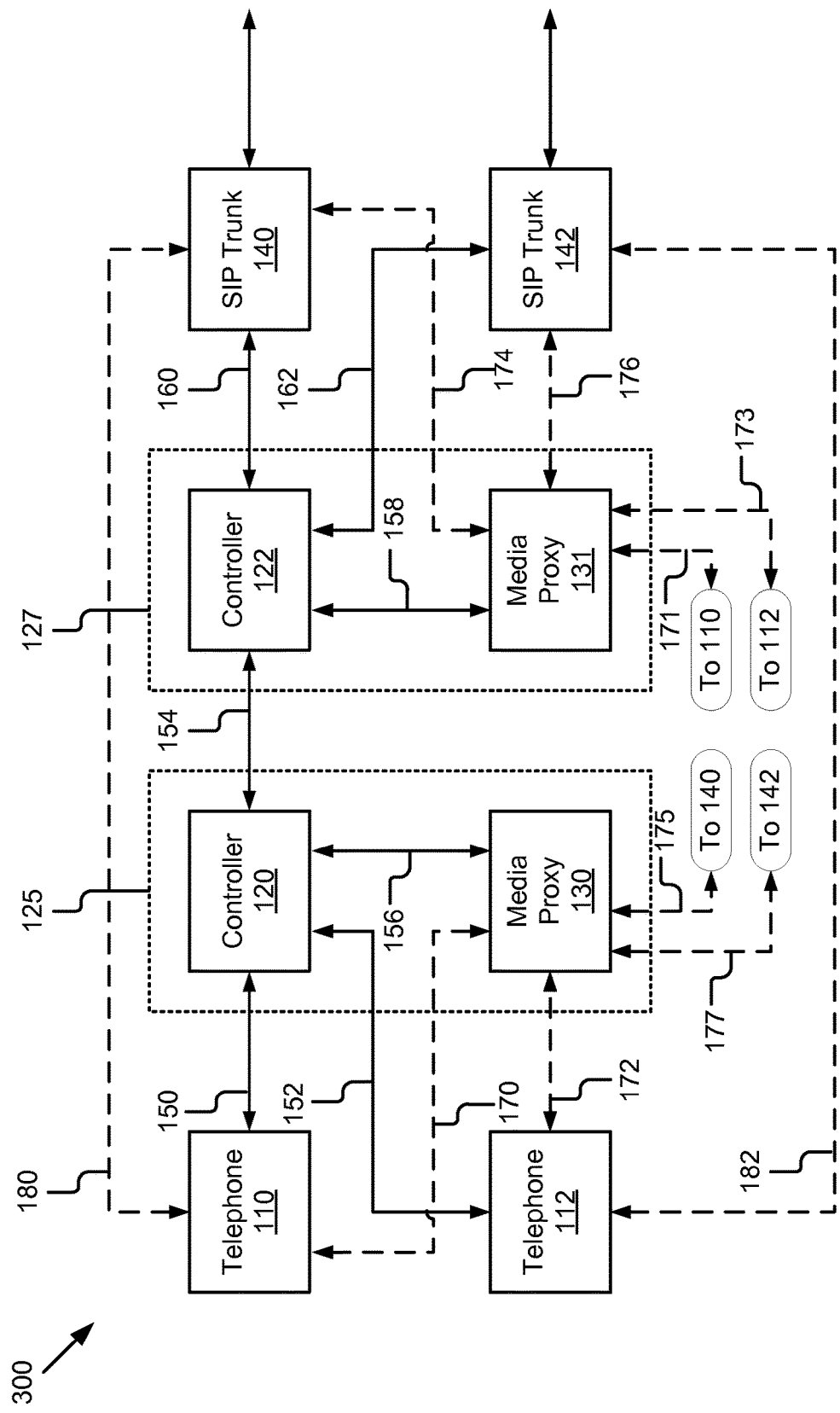
FIG. 3 is a block diagram of the VoIP system with the media proxy and controller serving as a switch in two locations, as indicated by broken lines and indicated by reference numerals 125 and 127.
Figure 4:
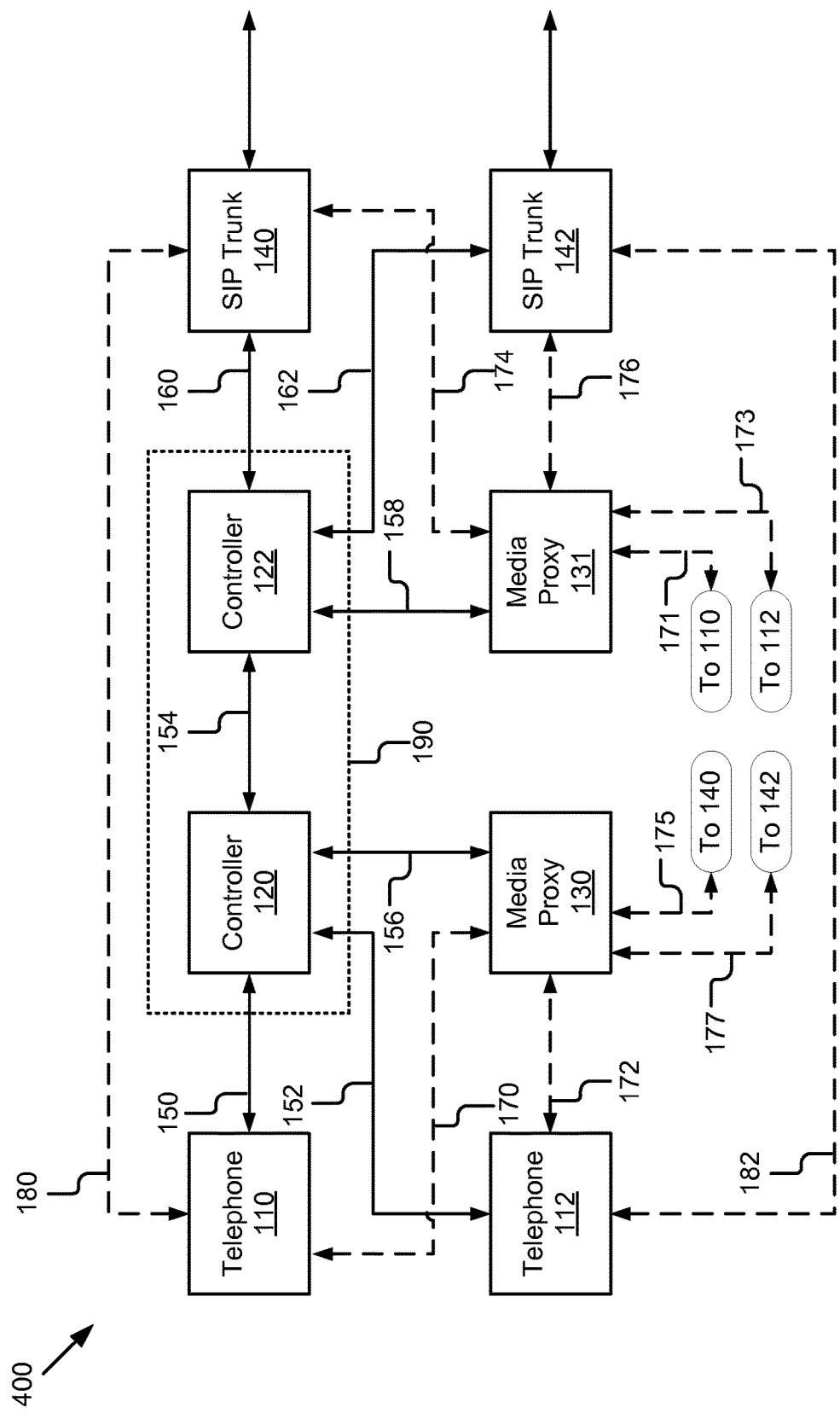
FIG. 4 is a block diagram of the VoIP system, illustrating a configuration with a plurality of dynamic media proxies.

In FIG. 1, the system architecture as illustrated includes the media proxy internal to the VOIP system and coupled to two controllers as shown. In FIG. 2, the system architecture as illustrated includes the media proxy external to the VoIP system and coupled to two controllers as shown. In FIG. 3, the system architecture as illustrated includes two media proxies and two controllers, all internal to the system. In FIG. 4, the system architecture includes two media proxies and one controller, all internal to the system.

FIG. 1 illustrates a VoIP system 151, according to some embodiments of the system architecture. The system architecture, as shown, includes two telephones 110 and 112, two controllers 120 and 122, and a single media proxy 130. In some embodiments, two SIP trunks 140 and 142 may be external to the system 151. The SIP trunks 140 and 142 provide connectivity to external entities (not shown), for example, with users external to the system on the public network (e.g., Internet), a private network (LAN) or the public switched telephone network (PSTN). These elements are connected (coupled) with one another, as shown, by a number of control (signaling) paths 150, 152, 154, 156, 156, 158, 160 and 162, and by a number of media (content, voice/data) paths 170, 172, 174, 176, 180 and 182. The functionality and control of these elements and at least a portion of their interactions or communications with one another are described.

Transmissions from the telephones 110 and 112 are controlled by signaling paths 150 and 152, respectively, from the controller 120. Signaling is typically performed using SIP or other VoIP protocols such as MGCP or H.323, which are transported over typical computer networking protocols, such as user datagram protocol (UDP), transmission control protocol (TCP), or transport layer security (TLS) protocol.

Voice data (media) is typically transported using the real-time transport protocol (RTP) protocol, and may flow directly between devices involved in the session over the media paths 180 and 182, or may be proxied through the media proxy 130 via the media paths 170 and 172.

In the illustrated embodiment, the two controllers 120 and 122 are used to control signaling for "call" setup and feature invocation. The controllers 120 and 122 communicate with each other using typical network protocols over the control path 154. This communication may be session initiation protocol (SIP) or other proprietary signaling protocol. In this embodiment, the media proxy 130 is provided internal to the system 151, and provides additional capabilities to the system 151 that are described below.

The media proxy 130 communicates with either of or both of the controllers 120 and 122, using typical networking protocols over control paths 156 and 158, respectively. The media proxy 130 receives commands from the controllers 120 and 122 to set up real-time transport protocol (RTP) sessions on media paths 170, 172, 174, and 176, and route them internally. Furthermore, the media proxy 130 provides information to the controllers 120 and 122 to invoke and support certain functionalities.

The SIP Trunks 140 and 142 are controlled via the SIP protocol from the controller 122 via control paths 160 and 162, respectively. Voice data (one example of media) is transported using the RTP protocol, and may flow directly between the telephones 110 and 112 and SIP Trunks 140 and 142, directly over media paths 180 and 182, or indirectly through the media proxy 130, via media paths 174 and 176. It should be recognized that the SIP Trunks 140 and 142 and telephones 110 and 112 are examples of endpoint entities in the network. Other Voice over IP (VoIP) entities may be used in the network including voicemail, interactive voice response (IVR), conference bridges, etc.

FIG. 2 illustrates a VoIP system, indicated generally by reference numeral 200. Many of the elements may be similar or identical to elements illustrated and described with respect to FIG. 1. The system architecture illustrated here includes two telephones 110 and 112, two controllers 120 and 122, a single media proxy 130, and two SIP trunks, 140 and 142. These elements are connected (or coupled) with one another, as shown, by a number of control (signaling) paths 150, 152, 154, 156, 158, 160 and 162, and by a number of media (voice/data) paths 170, 172, 174, 176, 180 and 182.

In the system architecture 200, broken lines or a dashed-line box 202 is drawn around the telephones 110 and 112 and the controllers 120 and 122, to illustrate that these elements are within the VoIP system. In this illustrated embodiment, the media proxy 130 may reside outside or external to the VoIP system.

FIG. 3 illustrates yet another configuration of a VoIP system 300. Many of the elements may be similar or identical to elements presented in and discussed with respect to FIG. 1. The system architecture includes two telephones 110 and 112, two controllers 120 and 122, and two media proxies 130 and 131. A configuration with two media proxies, rather than one, provides greater media bandwidth for allocating. Two SIP trunks 140 and 142 are illustrated. These elements are connected (or coupled) with one another, as shown, by a number of control (signaling) paths 150, 152, 154, 156, 158, 160 and 162, and by a number of media (voice/data) paths 170, 171, 172, 173, 174, 175, 176, 177, 180 and 182.

Each of the two media proxies 130 and 131 are associated with a respective one of the two controllers 120 and 122. In this system configuration, a combination of the controller 120 and the media proxy 130 serves as a switch 125. Similarly, the combination of the controller 122 and the media proxy 131 serves as a switch 127.

The media proxies 130 and 131 are connected via the media paths 170-173 to the telephones 110 and 112, and are connected via the media paths 174-177 to the SIP trunks 140 and 142.

In this and other embodiments of the system architectures shown, one or more of the media proxies may be co-resident with an associated one of the controllers 120 and 122, and embodied in the same hardware as one another. In FIG. 1 for example, the media proxy 130 may be co-resident with the controller 120, or with the controller 122. In FIG. 3, the media proxy 130 may be co-resident with the controller 120, and the media proxy 131 may be co-resident with the controller 122.

FIG. 4 illustrates VoIP system architecture, illustrated generally by reference numeral 400. Many of the elements may be similar or identical to elements illustrated and discussed with respect to FIG. 1. The system architecture illustrates two telephones 110 and 112, controllers 120 and 122 (configured as a single controller 190 in this embodiment, as is illustrated by broken lines around controllers 120 and 122), two media proxies 130 and 131, and two SIP Trunks 140 and 142. The functionality of a single controller may be substantially identical to the controllers 120 or 122, except that it is provisioned to control at least two media proxies, rather than one. These elements are connected or coupled with one another, as shown, by a number of control (signaling) paths 150, 152, 154, 156, 158, 160 and 162, and by a number of media (voice/data) paths 170-177, 180 and 182. In this illustrated embodiment, both of the two media proxies 130 and 131 are associated with the single controller (a single controller having functionality similar to either of controllers 120 or 122).

The various system configurations or architectures illustrated generally by reference numerals 151, 200, 300 and 400, described above, are intended to be representative, rather than limiting, and those skilled in the art should recognize that other variations are possible.

Example Methods

Some examples of methods of operation are now illustrated, to indicate how the various elements of the system architecture interact to implement a number of exemplary call features. The examples that are described here are merely illustrative, and by no means should be considered to be exhaustive of all the features that may be implemented by the system embodiments described in this application. These methods are described with flowcharts, with one or more operations in each block illustrated, generally occurring in the sequence that they are described and illustrated. For consistency and clarity, these examples are described for the system 151 shown in FIG. 1, unless otherwise indicated. Those skilled in the art should understand how to implement the methods performed in the systems 200, 300, and 400 of FIGS. 2-4 based on the descriptions set forth with respect to the system architecture illustrated in FIG. 1.

The term "controller" may be used to refer to either one of, or both, of the controllers 120 and 122. Either one of the telephones 110 or 112 and either one SIP trunk 140 or 142 are an example of any one or all of the telephones and trunks in the system architectures 151, 200, 300, or 400 that are illustrated here. Generally, the example methods described below on the functionalities of the system architecture are in the context of one media proxy 130. In addition, any reference to a user (not shown) performing a task on the system, is primarily via a telephone (or any such device for communicating), via which the user may initiate calls, answer calls, and cause various call features to be activated. It should also be recognized that the term telephone may be used interchangeably with the term "user" or may encompass operations performed by the user. In addition, it may be any device for initiating or conducting a communication. It should also be recognized that a "call" refers to any type of communication between two parties.

Figure 5A:
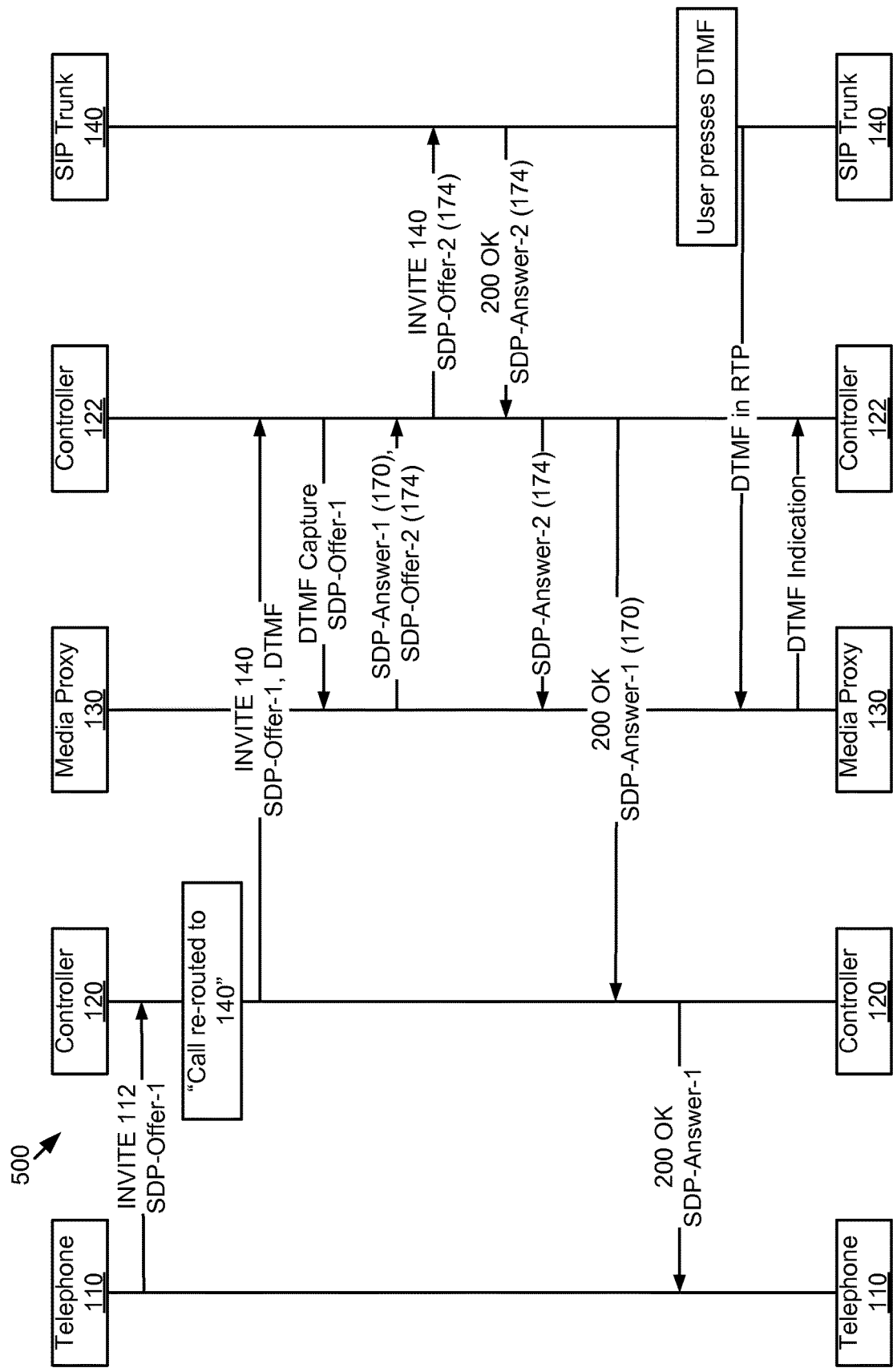
FIG. 5A is a sequence diagram illustrating a method for capturing DTMF tones according to some embodiments of the VoIP systems.

Referring now to FIG. 5A, the operations and functionalities performed by the system architecture to capture DTMF are performed when calls are initiated. Dual-tone multi-frequency (DTMF) refers to the standard tone pairs used on telephone terminals for dialing, using in-band signaling. For example, a user typically hears beeps when dialing a touch-tone telephone to initiate a call.

For VOIP calls, DTMF signals typically follow the media path (RTP). Referring also to FIG. 1, a call between the telephone 110 and the SIP trunk 140 would generally route the audio (speech) and the DTMF data (tones) directly between the telephone 110 and the SIP trunk 140 via the media path 180. Similarly, for the telephone 112 (FIG. 1) and the SIP trunk 142 (Figure), DTMF data (tones) are routed via the media path 182 (FIG. 1).

In the example illustrated in FIG. 5A, the controller 120 or 122 requires the DTMF information in order to enable any "mid-call" feature, for example, a "mid-call" transfer, which is not supported by other signaling operations. To enable a "mid-call" feature, the controller 120 (or 122 shown in FIG. 1) requires access to DTMF data from the SIP trunk 140 (or the SIP trunk 142 in FIG. 1) or the telephone 110 (or the telephone 112 in FIG. 1). Some examples of other features that may be implemented while a call is in progress or in the middle of a call (referred to as "mid-call") include adding a party or implementing a "conference" or placing a party on "hold." For a mid-call transfer, a call to the SIP trunk 140 may be one that is on behalf of an internal user, and the internal user may be allowed to transfer the call to another telephone, using a simple DTMF sequence, for example, "*23" to initiate the transfer. As one example of a typical situation where such a mid-call transfer is performed is when a secretary answers a call and transfers it to his or her boss. Both the secretary and the boss are internal users within the VoIP system.

FIG. 5A is a block diagram illustrating one example indicated generally by reference numeral 500 of how a mid-call transfer may be implemented in the example system architecture 151. The example may occur in the context of a user who is on the telephone 110 and in the middle of a call with someone else, residing either internal to or external to the system 151. FIG. 5A depicts how the call may be set up to capture DTMF signals, after which they could be used for features such as transfer. The DTMF signals are captured from the user on the trunk 140.

Figure 5B:
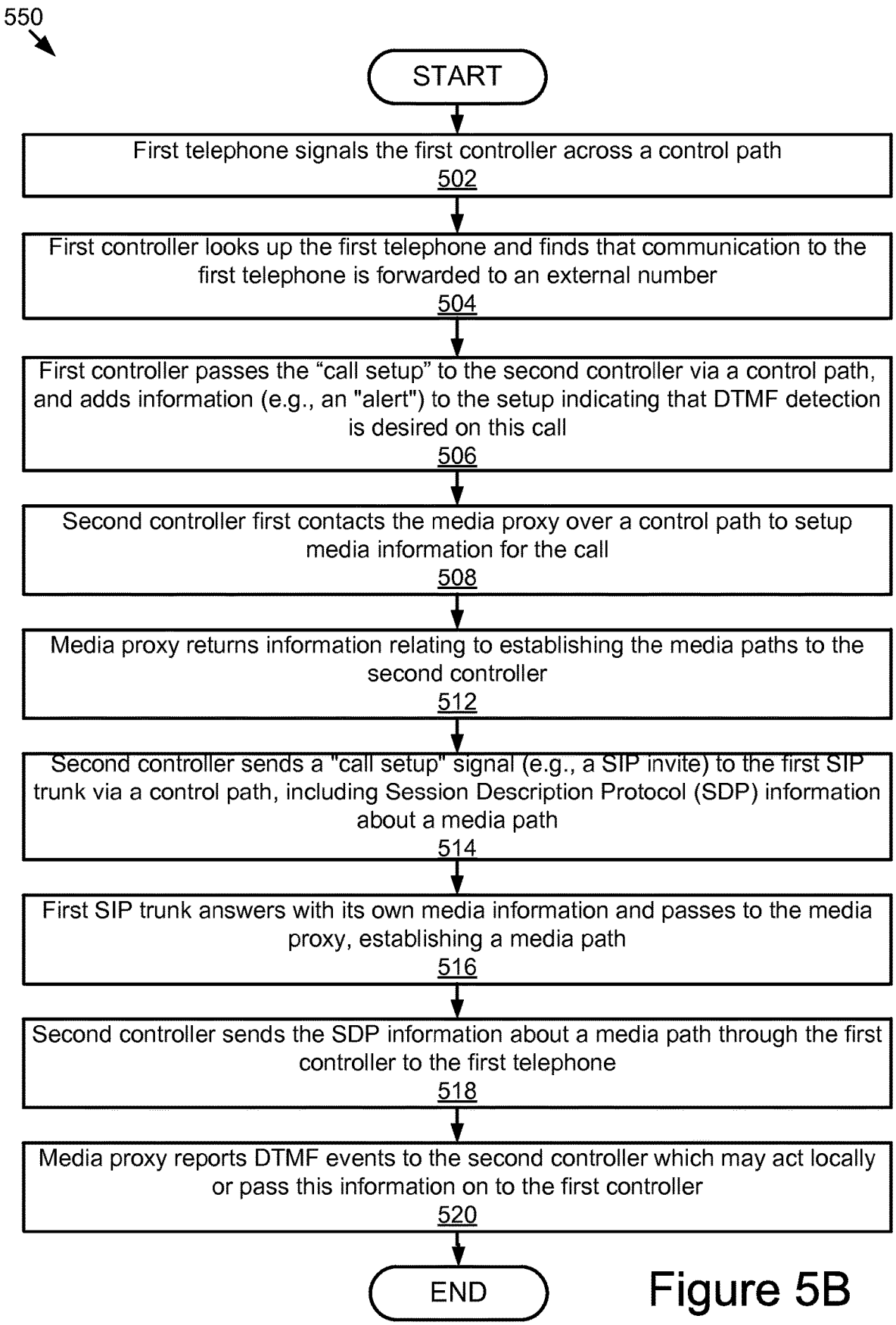
FIG. 5B is a flow chart illustrating a method for capturing DTMF tones for some embodiments of the VoIP systems.

Referring also to FIG. 5B (in conjunction with FIG. 5A), in accordance with an example method, a first telephone 110 signals the first controller 120 across the control path 150, which operation (one or more to perform this function) is indicated by block 502. The method proceeds to block 504, where in response, the first controller 120 looks up the telephone number dialed by the first user (identifying telephone 112), and discovers that calls to telephone 112 are forwarded to a telephone with an external telephone number. The method proceeds to the next block 506, at which stage one or more operations are performed, including where the controller, for example controller 120, passes the call "setup" to the controller 122, via the control path 154, and adds information (for example, an "alert") to the "setup" indicating that DTMF detection is desired on this call. As one example, if a call is initiated outside of a LAN, DTMF detection is highly desirable. The method proceeds to the next block of one or more operations, indicated by reference numeral 508, at which point, the controller 122 first contacts the media proxy 130 over control path 158 to setup media information for the call that has been initiated. Typically, in a VoIP system, this functionality would use session description protocol (SDP). For example, an INVITE including the SDP is passed to the media proxy 130. At the next block of one or more operations, indicated by reference numeral 512, the media proxy 130 returns information that relates to establishing the media paths 170 and 174 to the second controller 122. The method proceeds to the next block of one or more operations, indicated by reference numeral 514, at which point, the second controller 122 sends a "call setup" signal, typically a SIP INVITE, to SIP trunk 140, via control path 160, including session description protocol (SDP) information about the media path 174.

The method proceeds to the next block of one or more operations, indicated at 516, where the SIP trunk 140 answers with its own media information, and this is passed to the media proxy 130, thus, establishing the media path 174. The method proceeds to the next block of one or more operations, indicated at 518, where the second controller 122 sends the SDP information about the media path 170 through the first controller 120, to the telephone 110. In this way, the media path 170 is established, passing through the media proxy 130.

The method proceeds to the next block of one or more operations, indicated at 520, where the media proxy 130 detects the DTMF, usually via RFC2833 RTP packets, and reports these events to the second controller 122, which may act locally, or pass this information on to the first controller 120.

Similarly, a DTMF detection capability may be added after a call setup operation is performed, by having the first controller 120 send a session update, typically a SIP re-INVITE, to the second controller 122, indicating that it is searching to detect DTMF, and following a procedure similar to that described above.

Figure 6A:
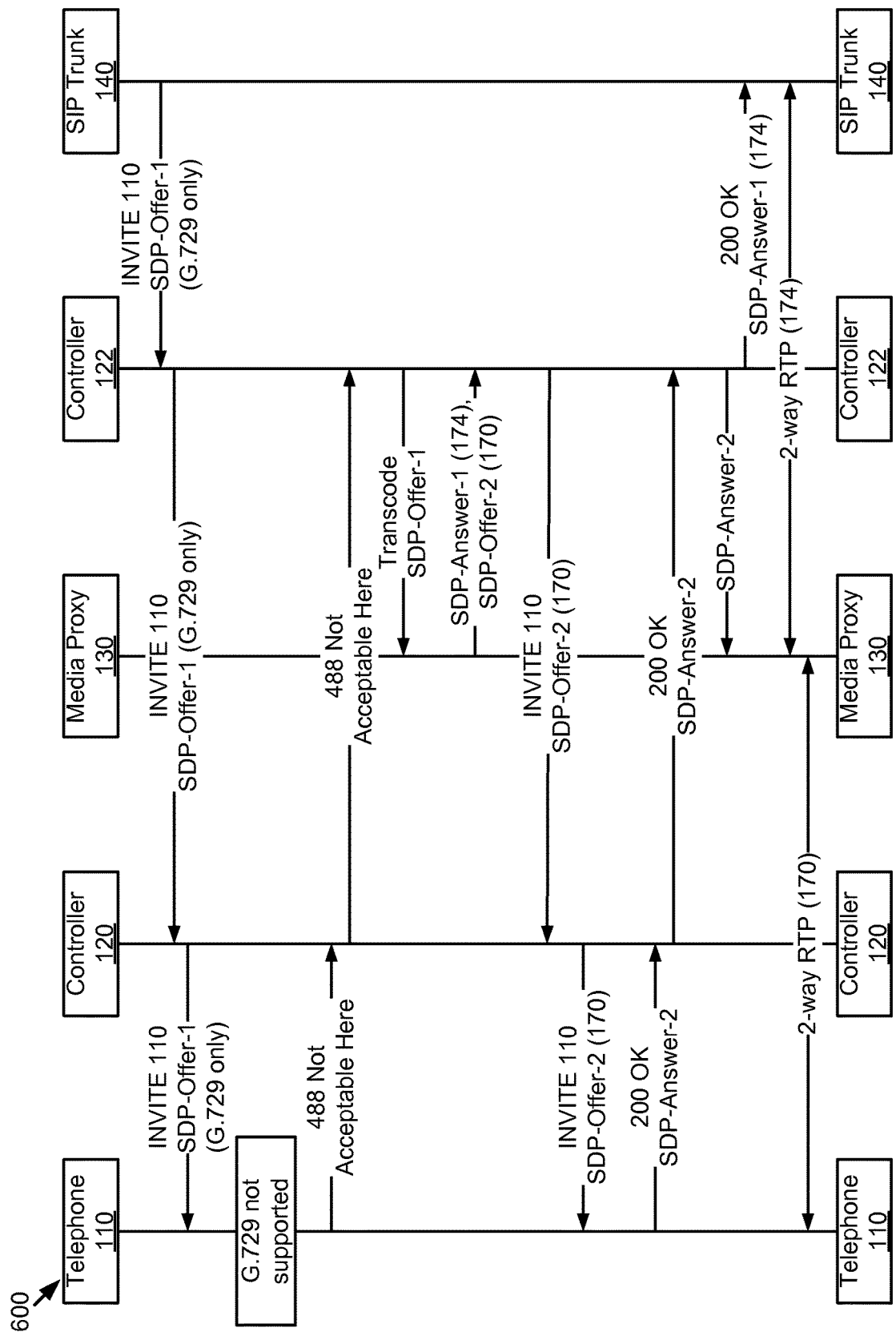
FIG. 6A is a sequence diagram (of a use scenario) illustrating a method for handling a codec mismatch according to some embodiments of the VoIP systems.
Figure 6B:
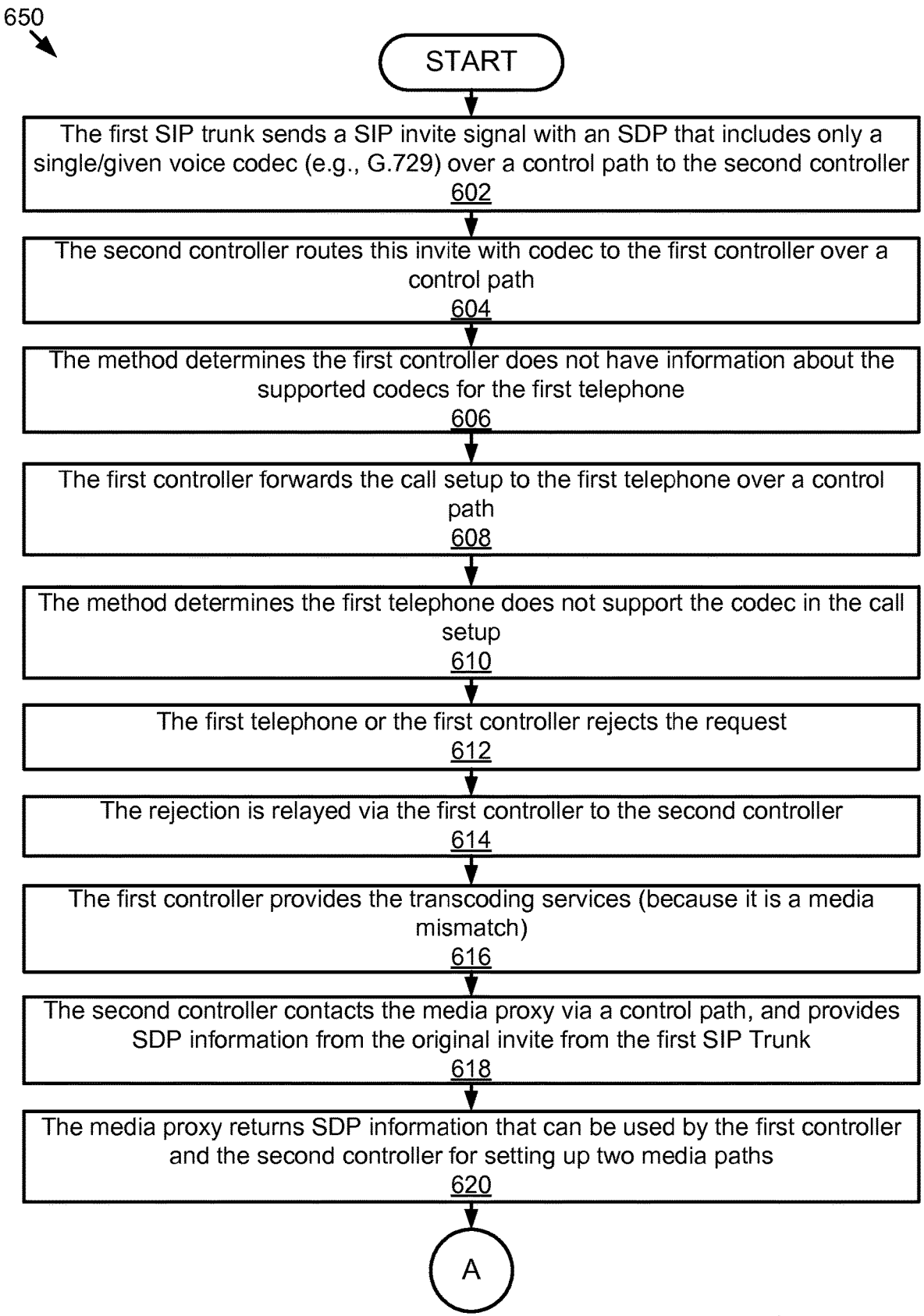
FIG. 6B is a flow chart illustrating the method for handling a codec mismatch according to some embodiments of the VoIP systems.
Figure 6C:
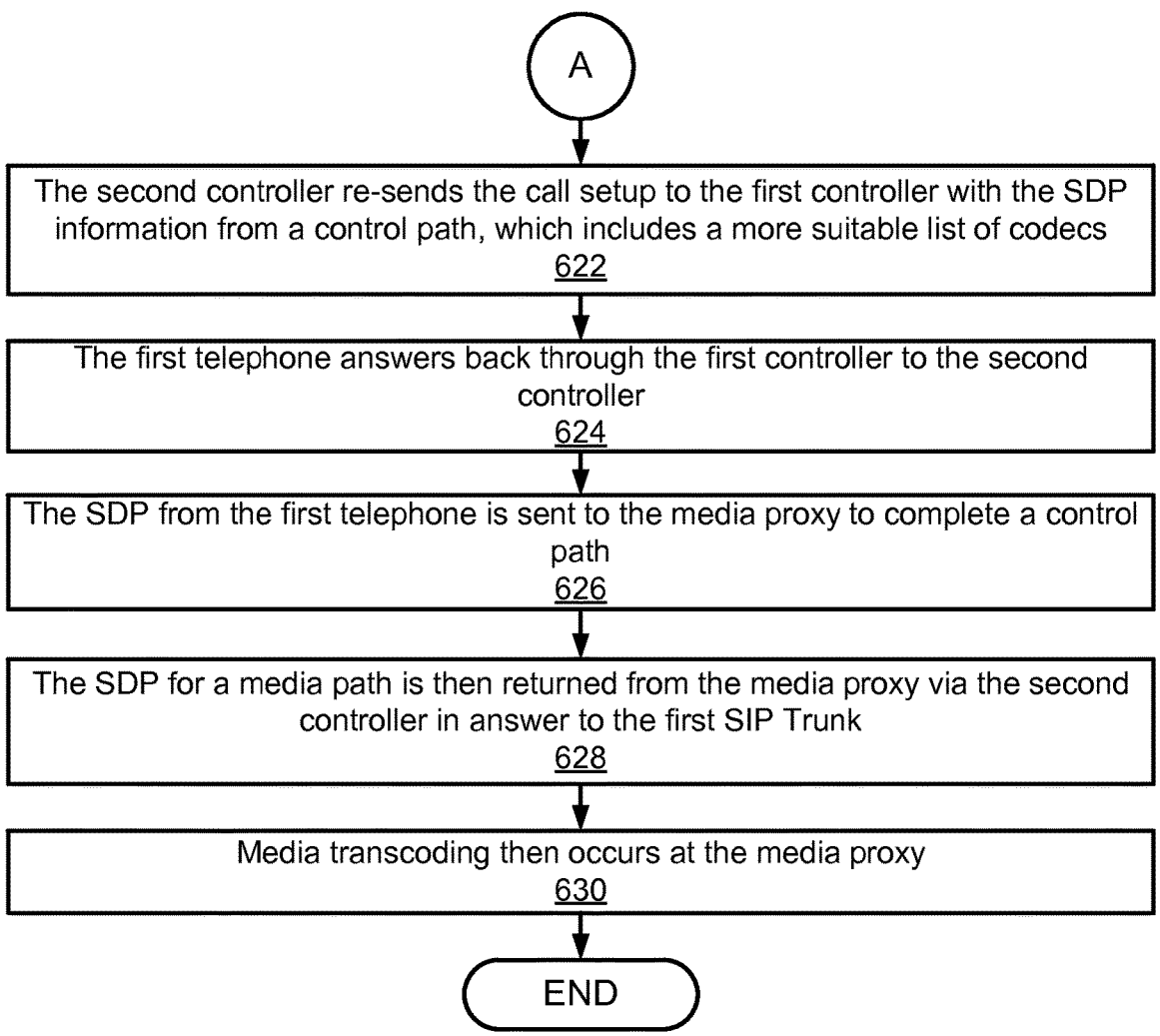
FIG. 6C is a flow chart illustrating a continuation of the method illustrated in FIG. 6B.

Referring now to FIGS. 6A, 6B, and 6C, an example operation for detecting a codec mismatch is described. It should be recognized that a codec is a device or computer program capable of encoding and/or decoding a digital data stream or signal. The term "transcoding" as used here refers to a process of converting one digital format to another, or re-encoding a digital file in order to change one or more parameters.

As another example, in VoIP systems of the type that are described here, transcoding is required between two devices that are in communication. For example, the SIP trunk 140 may attempt to initiate a call with the telephone 110, but the two devices may have been provisioned without any codecs in common. This typically results in a failure to establish a call. FIG. 6A illustrates an example, indicated generally by reference numeral 600, of how a codec mismatch is handled in the example system architecture 151 that is illustrated in FIG. 1. Although a number of operations are shown to illustrate the functionalities described, it should be recognized that one or more operations and details of the operations may be omitted in the interest of illustrative clarity.

Referring now to FIGS. 6B and 6C (FIG. 6C is a continuation of the flow chart 6B) in conjunction with FIG. 6A to describe the example method (indicated in FIG. 6B by reference numeral 650 and in FIG. 6C by reference numeral 675), as indicated by block 602, the SIP trunk 140 sends a SIP INVITE signal (or message) with session description protocol (SDP) that includes only a single/given voice codec (for example G.729) over the control path 160 to the second controller 122. FIG. 6A illustrates a sequence diagram indicating the telephone 110, the controller 120, the media proxy 130, the controller 122, and the SIP trunk 140.

The method proceeds to block 604, at which stage, the second controller 122 routes this INVITE with codec to the first controller 120 over the control path 154. It should be understood that in embodiments that only utilize a single controller, for example, as illustrated in FIG. 4 (by broken lines around controllers 120 and 122 and indicated by reference numeral 190), this block of one or more operations would be omitted.

The method proceeds to block 606, at which point, it may be determined that the first controller 120 may not have information on the codecs supported by the telephone 110. In this instance, the first controller 120 forwards the "call setup" to the telephone 110 over the control path 150, as indicated by a block 608, to illustrate one or more operations to perform this functionality. The method proceeds to block 610, where it may be determined that the telephone 110 may not support the codec required for the "call setup." If it is determined that the telephone 110 does not support the codec required for the call setup, it is typical for the system to reject the call. In SIP protocol, this would typically be rejected with a "488 Not Acceptable Here" response. The method proceeds to block 612, at which stage, either the telephone 110 or the controller 120 reject the request and therefore, the call. The method proceeds to block 614, at which stage, this rejection is relayed via the first controller 120 to the second controller 122; which because of the media mismatch, decides to provide the transcoding services, as indicated by block 616.

The method proceeds to block 618, at which stage, the second controller 122 does not relay the rejection ("488") to the SIP trunk 140. Instead, it contacts the media proxy 130 via the control path 158, and provides SDP information from the original INVITE from the SIP Trunk 140.

The method proceeds to block 620, at which stage, the media proxy 130 returns SDP information that may be used by the first and second controllers 120 and 122 for setting up the media paths 170 and 174. Referring now to FIG. 6C, the method continues to block 622, at which stage, the second controller 122 re-sends the "call setup" to the first controller 120 with the SDP information from the path 170, which includes a more suitable list of codecs. It should be understood that in embodiments that involve a single controller, for example, FIG. 4, this block of operations may be omitted. The method proceeds to block 624, at which point, the SDP information is relayed to the telephone 110, which answers back through the first controller 120 to the second controller 122.

The method proceeds to block 626, at which stage, the SDP received from the telephone 110 is sent to the media proxy 130 to complete the path 170. As illustrated by block 628, the SDP for the media path 174 previously returned from the media proxy 130, is sent via the second controller 122, in answer to the SIP trunk 140. The method proceeds to the next block 630, at which stage, the media transcoding occurs at the media proxy 130.

By handling a codec mismatch in this way as indicated generally by sequence diagram 6A, media proxy resources are only used when necessary, thereby, reducing the costs associated with utilizing resources only when needed.

Figure 7A:
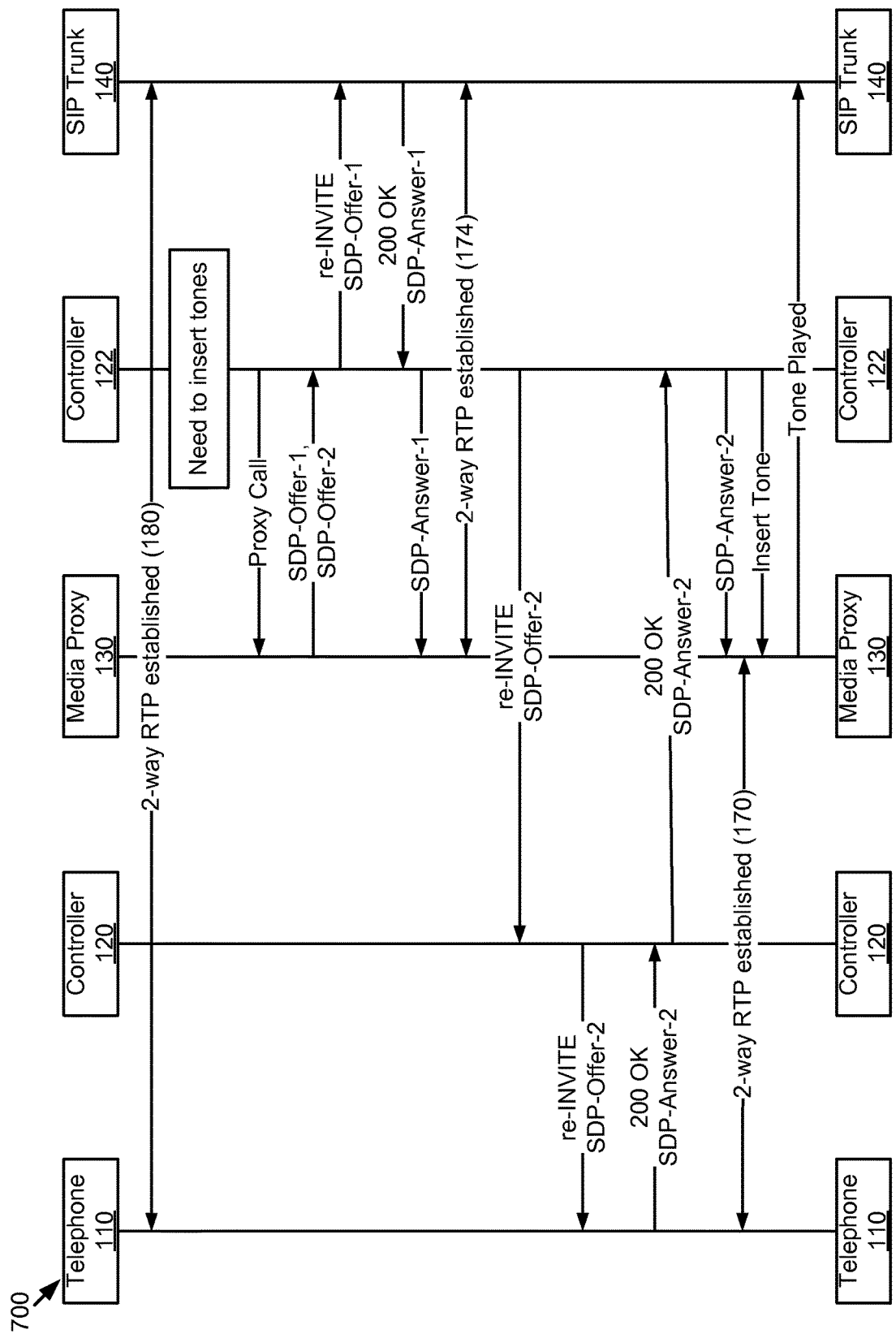
FIG. 7A is a use scenario or a sequence diagram illustrating a method for inserting tones in a call according to some embodiments of the VoIP systems.
Figure 7B:
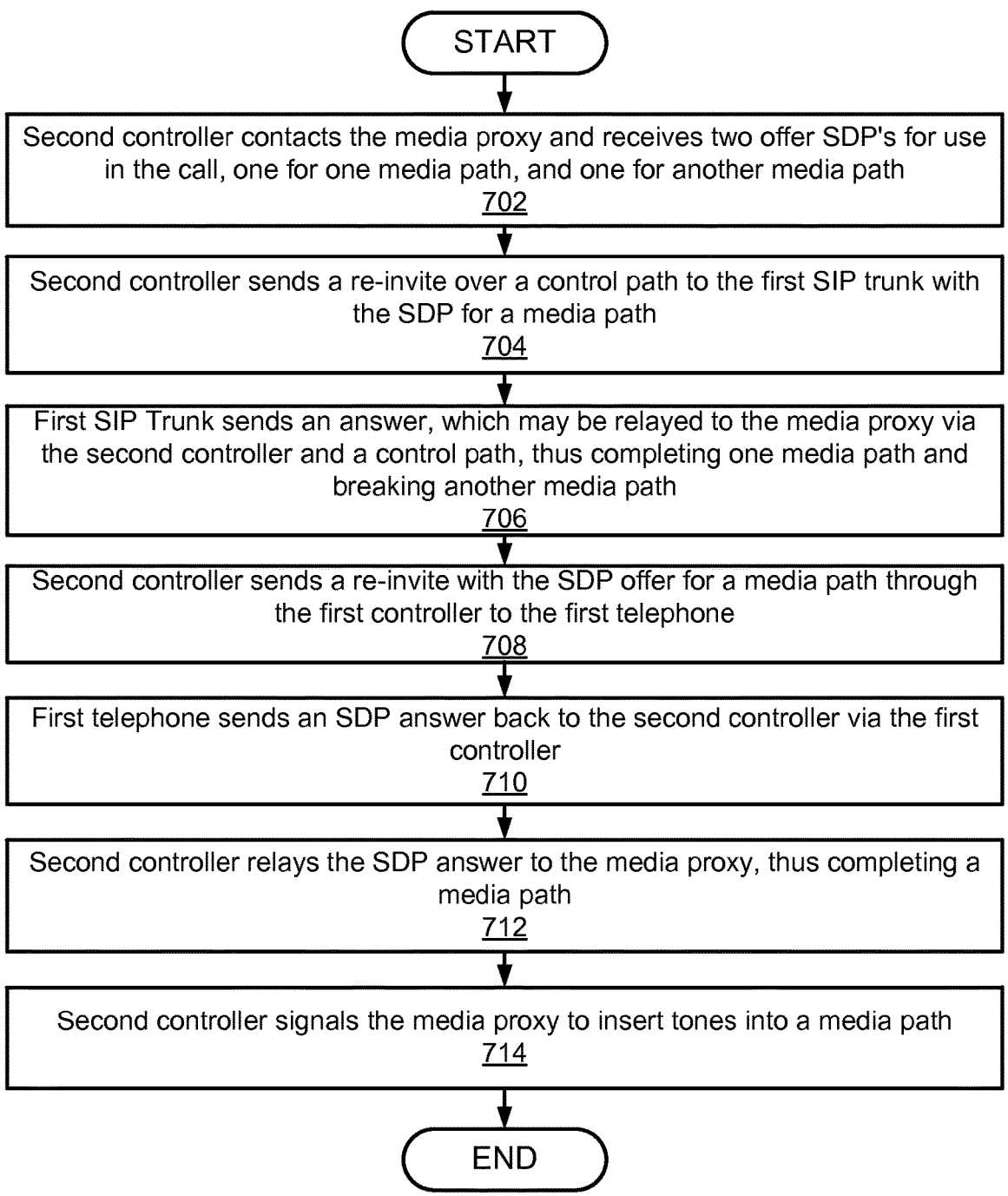
FIG. 7B is a flow chart illustrating the method for inserting tones in a call according to some embodiments of the VoIP systems.

FIGS. 7A and 7B illustrate a sequence diagram and a flow chart, respectively, to illustrate an example method for inserting tones. A controller 120 or 122 may wish to insert tones into a conversation between two parties. For example, a call may be established between the telephone 110 and the SIP trunk 140, using the media path 180. However, the party on the SIP trunk 140 may be an internal user of the system, and another call from a user external to the system (not shown) may be pending for this user.

While another trunk could be consumed to signal this event to the external user, the approach taken by the system architecture is to simply insert a "call waiting" tone into the media path towards the SIP trunk 140. FIG. 7A is a sequence diagram illustrating an example indicated generally by reference numeral 700 of how "tones" are inserted into a conversation, when a call is in progress, for example, if the second controller 122 wishes to insert a tone towards SIP trunk 140. With reference to FIG. 7B, the method begins at block 702, at which point, the controller 122 contacts the media proxy 130 and receives two OFFER SDP's for use in the call, one for the media path 170, and one for the media path 174. The method proceeds to the next step 704, at which point, the second controller 122 sends a re-INVITE over the control path 160 to the SIP trunk 140 with the SDP for the media path 174. The method proceeds to block 706, where the SIP trunk 140 sends an ANSWER, which may be relayed to the media proxy 130 via the second controller 122 and the control path 158, thus, completing the media path 174 and breaking the media path 180. The method proceeds to the next block 708, at which stage, the second controller 122 sends a re-INVITE with the SDP OFFER for the media path 170 through the controller 120 to the telephone 110. At block 710, in response, the telephone 110 sends an SDP ANSWER back to the second controller 122, via the first controller 120. The method proceeds to block 712, at which stage, the second controller 122 relays this ANSWER to the media proxy 130, thus, completing the media path 170. The method proceeds to block 714, at which point, the second controller 122 signals the media proxy 130 to insert tones into the media path 174.

Figure 8A:
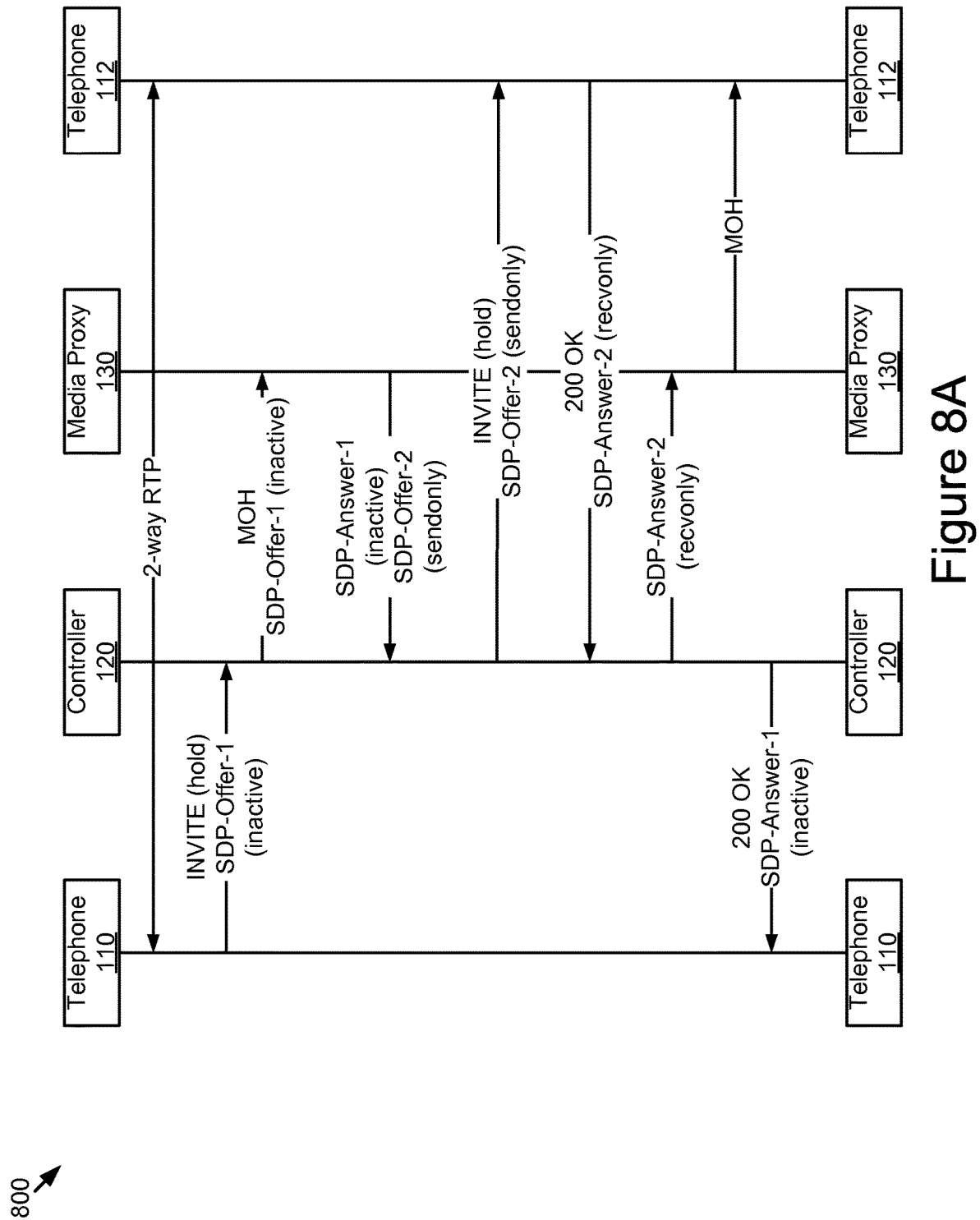
FIG. 8A is a use scenario or a sequence diagram illustrating a method for streaming music-on-hold according to some embodiments of the VoIP systems.
Figure 8B:
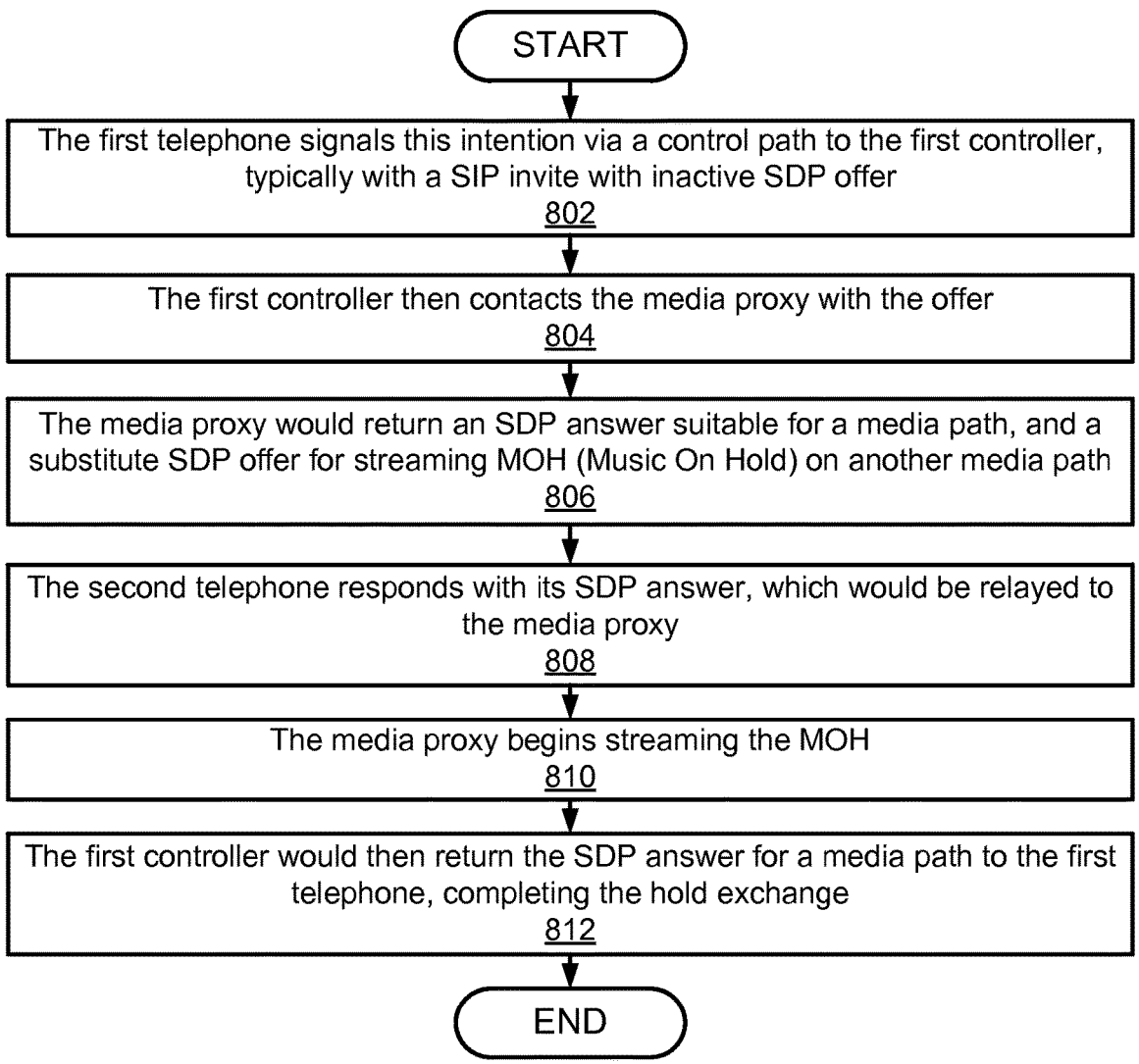
FIG. 8B is a flow chart illustrating the method for streaming music-on-hold according to some embodiments of the VoIP systems.

Referring now to FIGS. 8A and 8B an example method for "music-on-hold" ("MOH") is illustrated and described. Music-on-hold ("MOH") refers to the playing of recorded music to fill the silence that otherwise is faced by telephone callers who are placed on hold. Playing music while callers are on hold is especially common in situations involving customer service. A method similar to inserting tones, described with respect to FIG. 7, may be used for providing music-on-hold ("MOH") service. For example, the telephone 110 may be in a conversation with the telephone 112, with the call being set up through the controller 120. The media in this case would flow directly between the telephones (over the Local Area Network (LAN)). FIG. 8A is a sequence diagram illustrating an example of how a call is put on hold and how to provide the music-on-hold, as indicated generally by reference 800. FIG. 8B illustrates the method. The method begins at block 802, where if the user of the telephone 110 wishes to put the call in progress with the telephone 112 on hold, the user of telephone 110 signals this "intention" via the control path 150 to the first controller 120, typically with a SIP INVITE with inactive SDP OFFER. The method proceeds to the next block 804, at which stage the first controller 120 contacts the media proxy 130 with the OFFER. The method proceeds to the next block 806, at which stage, the media proxy 130 returns an SDP ANSWER suitable for the media path 170, and a substitute SDP OFFER for streaming MOH on the media path 172. At the next block 808, the telephone 112 responds with its SDP ANSWER that may be relayed to the media proxy 130. The method proceeds to the next block 810, at which stage the music-on-hold begins streaming. As one example, for the system architecture illustrated in FIG. 1, the music-on-hold ("MOH") 132 may be provided to the media proxy 130. As another example, for the system architecture illustrated in FIG. 3, the music-on-hold may be provided to the switch 127, via the media proxy 131. The method proceeds to block 812 where the controller 120 returns the SDP ANSWER for media path 170 to the telephone 110, completing the "Hold" exchange.

Figure 9A:
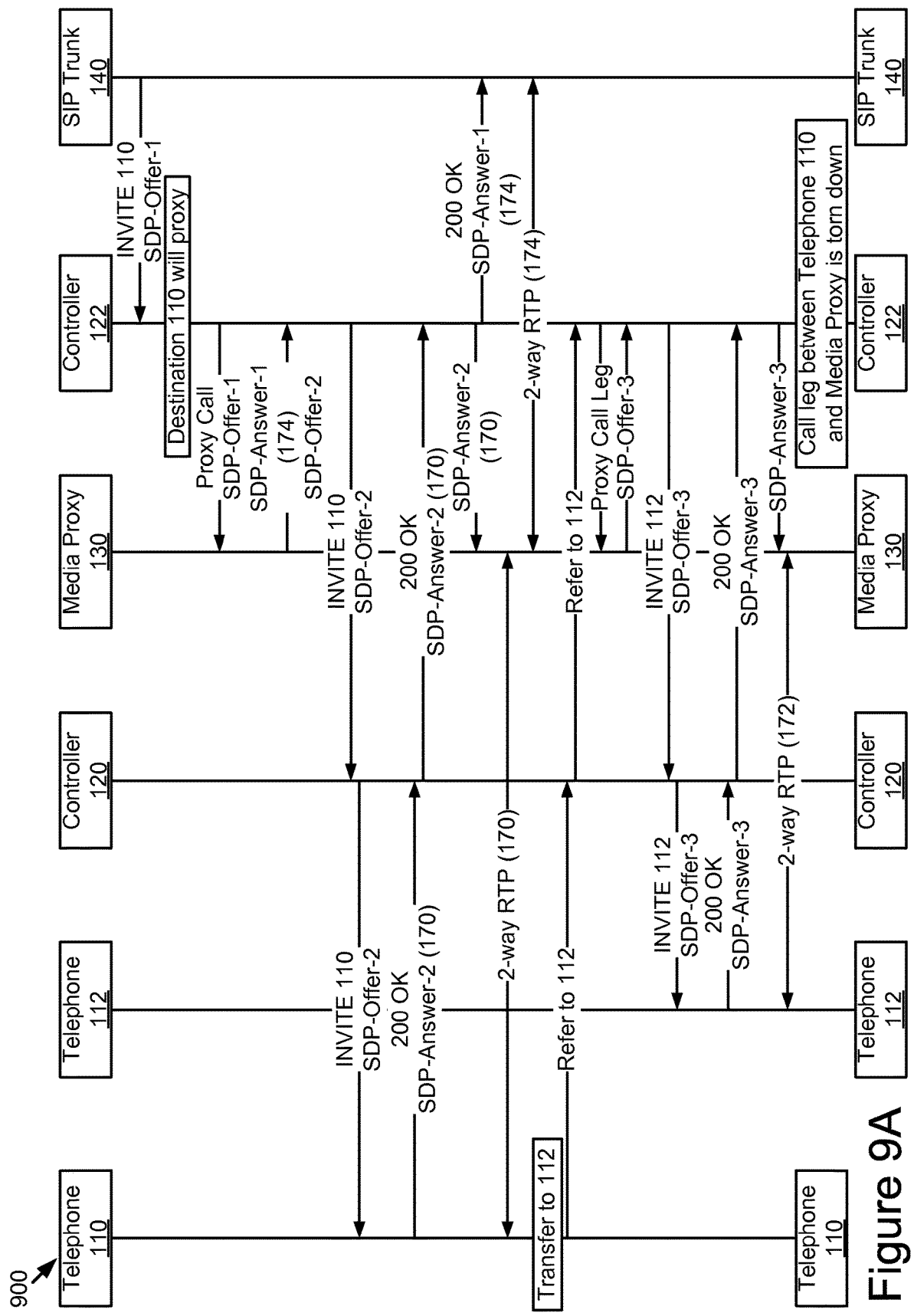
FIG. 9A is a use scenario or sequence diagram illustrating an example method for simplifying signaling according to some embodiments of the VoIP systems.
Figure 9B:
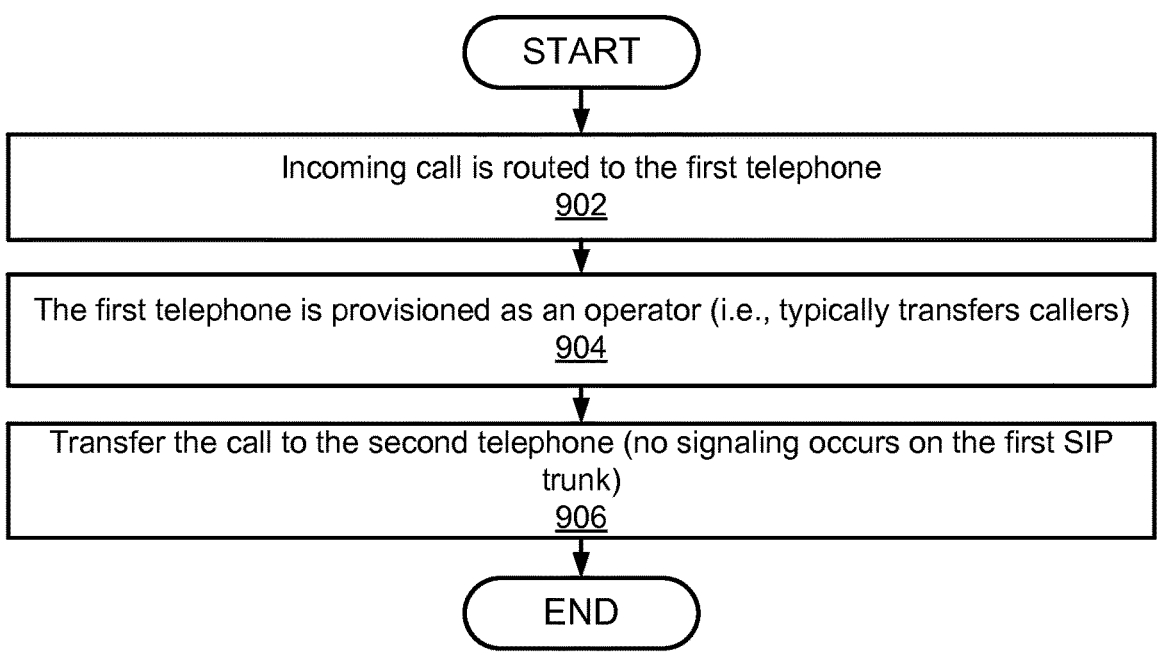
FIG. 9B is a flow chart illustrating the method for simplifying signaling according to some embodiments of the VoIP systems.

FIGS. 9A and 9B illustrate a sequence diagram and flow chart, respectively, for operations to simplify signaling. In certain cases, it may be desirable to insert the media proxy 130 on a call to simplify one side of the signaling. For example, an inbound call on the SIP trunk 140 may be directed to an Interactive Voice Response (IVR) application that prompts the caller for certain data, after which the call may be transferred to another application, such as a workgroup application, which may play a prompt to the caller, then search for agents, for example, customer representatives and finally transfer the caller to an agent or operator.

It should be recognized by those familiar with SIP and other VoIP technologies that this call scenario requires many message transactions between the controller 122 and the SIP trunk 140 and that it may have a higher chance of failure due to race conditions or other software errors. Race conditions may occur due to the asynchronous nature of SIP transmissions. Therefore, it is desirable to avoid such complicated call flows, especially on external interfaces where different manufacturers' equipment may be involved. To solve this problem, the controller 122 may select to use or set up the media proxy 130 immediately, on receiving an incoming call from outside the system, based on the destination of the call, or some other data. This set up occurs immediately, and the media session over the media path 174 remains constant for the remainder of the call. All of the complex transactions occur between controllers 120 and 122 and other elements 110, 112, and 130 of the system architecture 151 (FIG. 1). Typically, each of these elements are manufactured and tested by a single vendor, whereas the simplified signaling is presented to the trunk which most likely will be from a different vendor.

Referring now to FIG. 9B, the example method for simplifying signaling begins at block 902, where an incoming call may be routed to the first telephone 110. The method proceeds to block 904, where the first telephone 110 is provisioned as an operator (i.e., typically for transferring callers). The method proceeds to the next block 906, where the calls are transferred to the second telephone 112, with no signaling occurring on the first SIP trunk 140.

Figure 10A:
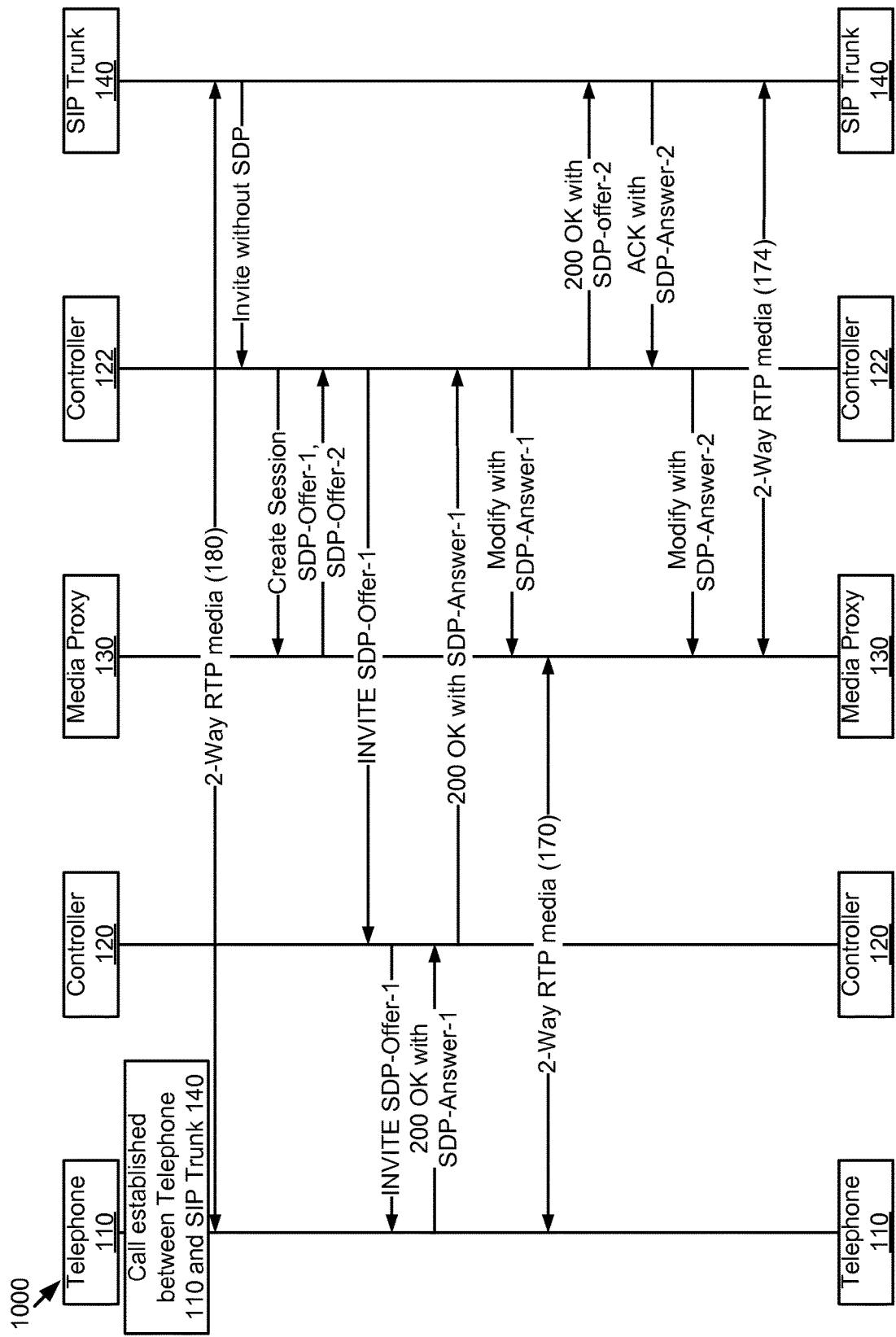
FIG. 10A is a use scenario or sequence diagram illustrating an example method for sending an invite without SDP for some embodiments of the VoIP systems.
Figure 10B:
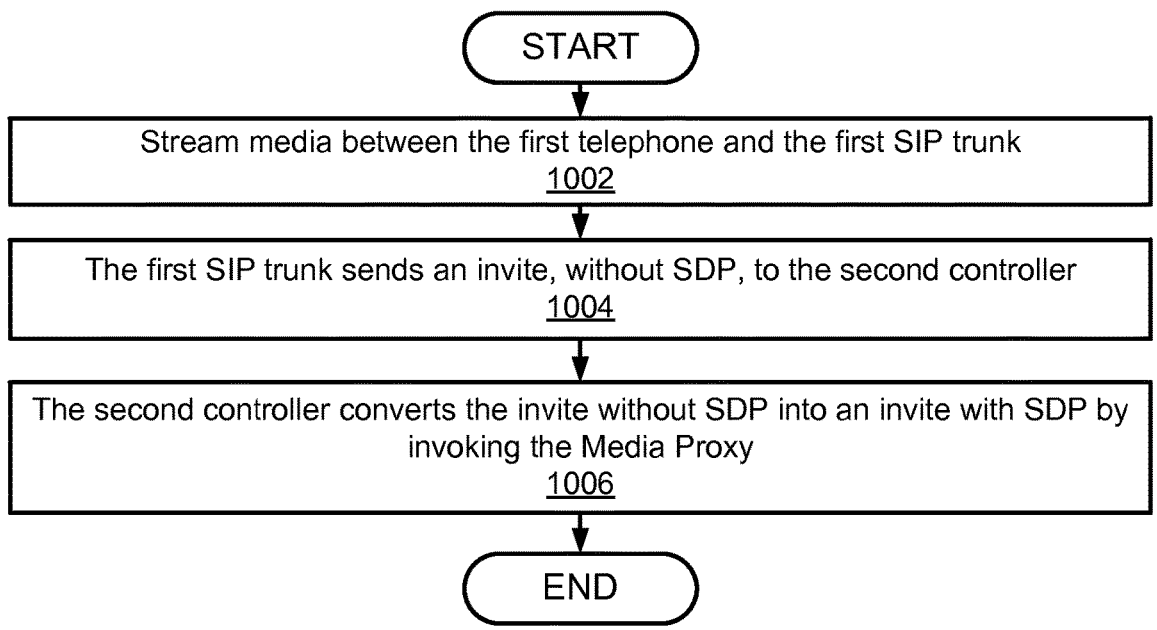
FIG. 10B is a flow chart illustrating the method for sending an invite for some embodiments of the VoIP systems.

FIGS. 10A and 10B indicate a sequence diagram and a flow chart of an example method for transmitting an invite without SDP. The sequence diagram 1000 illustrates the manner by which transmissions occur among the telephone 110, the first controller 120, the media proxy 130, the second controller 122, and the first SIP trunk 140. Referring to the flow chart 10B, the method begins at block 1002, at which stage, media may be streamed between the first telephone 110 and the first SIP trunk 140. The method proceeds to the next step 1004, at which point, the first SIP trunk 140 sends an invite, without SDP, to the second controller 122. The method proceeds to block 1006, where the second controller converts the invite, without SDP, into an invite with SDP, by invoking the media proxy 130.

Figure 11A:
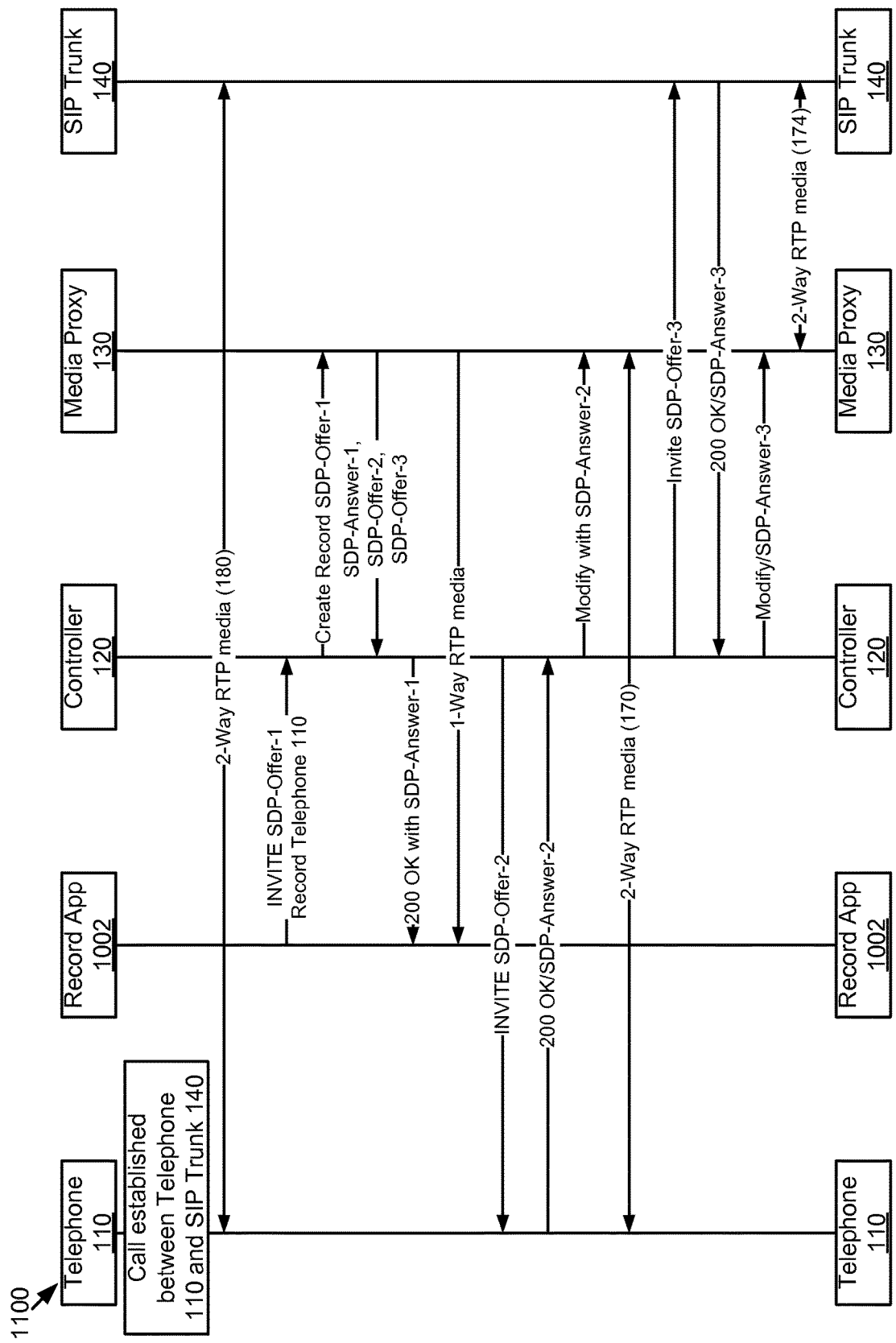
FIG. 11A is a use scenario or sequence diagram illustrating an example method for recording calls for some embodiments of the VoIP systems.
Figure 11B:
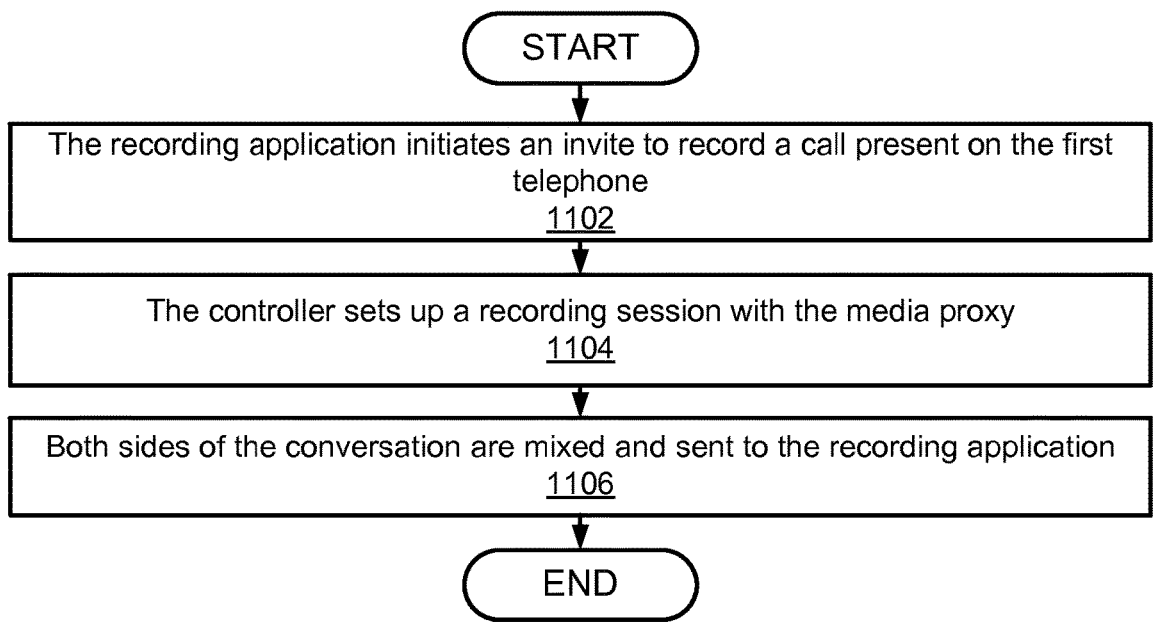
FIG. 11B is a flow chart illustrating the method for recording calls for some embodiments of the VoIP systems.

FIGS. 11A and 11B illustrate a sequence diagram indicated generally at 1100 and an example method indicated generally at 11B for recording a conversation. FIG. 11A illustrates the manner in which transmission occurs among the telephone 110, controller 120, the media proxy 130, the recording application ("Record App") 1002, and the SIP trunk 140. The example method begins at block 1102, at which stage, the recording application ("Record App") 1002 initiates an "invite" to record a call present on the first telephone 110. The method proceeds to the next block 1104, at which point, the controller 120 sets up a recording session with the media proxy 130. From there, the method proceeds to the next block 1106, at which stage, although the telephone 110 and the SIP trunk 140 may be in a two-way call, yet both sides of the conversation are mixed or blended and sent to the recording application ("Record App") 1002.

Figure 12A:
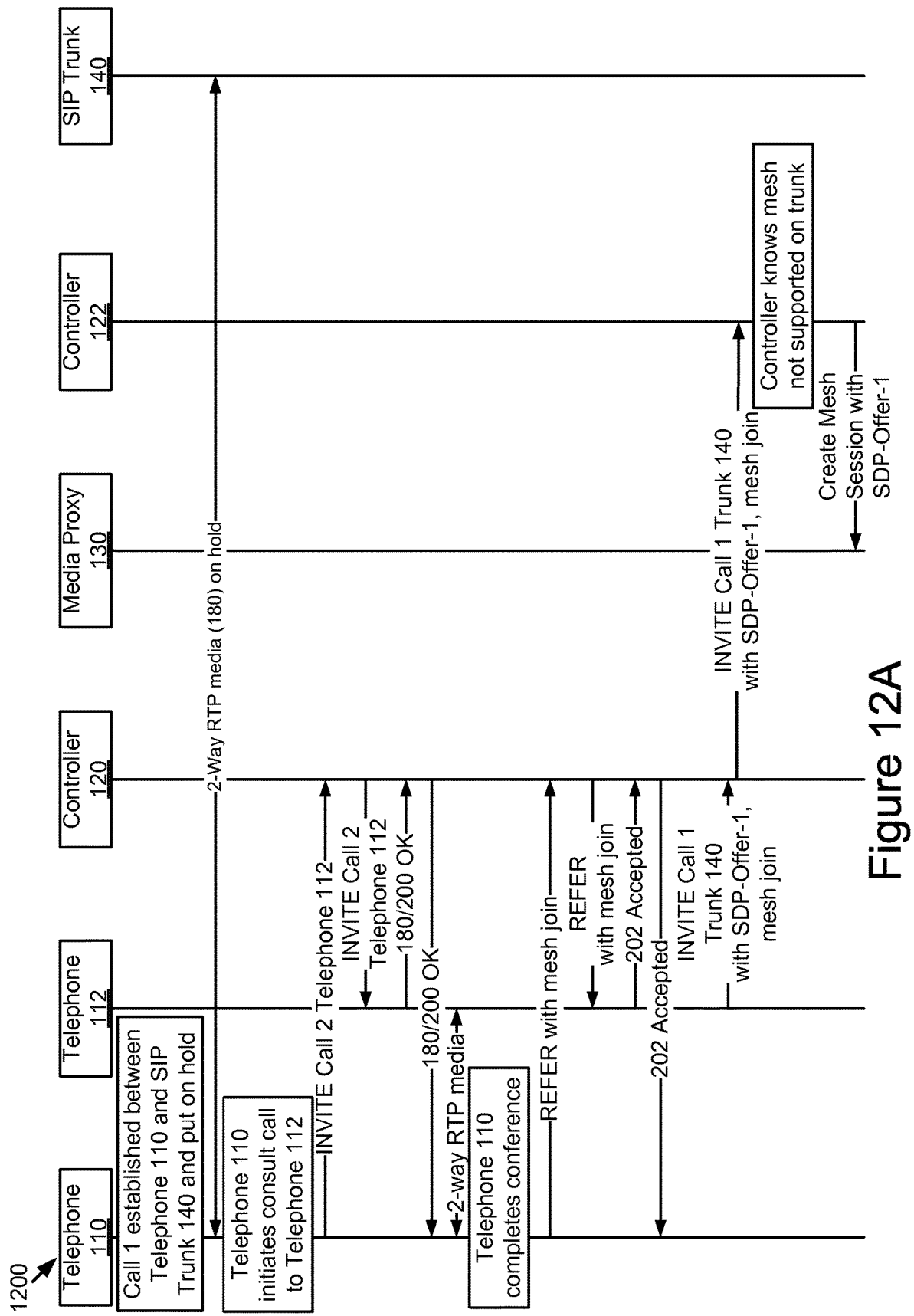
FIG. 12A is a use scenario or a portion of a sequence diagram for illustrating an example method for "meshing" a conference telephone call according to some embodiments of the VoIP systems.
Figure 12B:
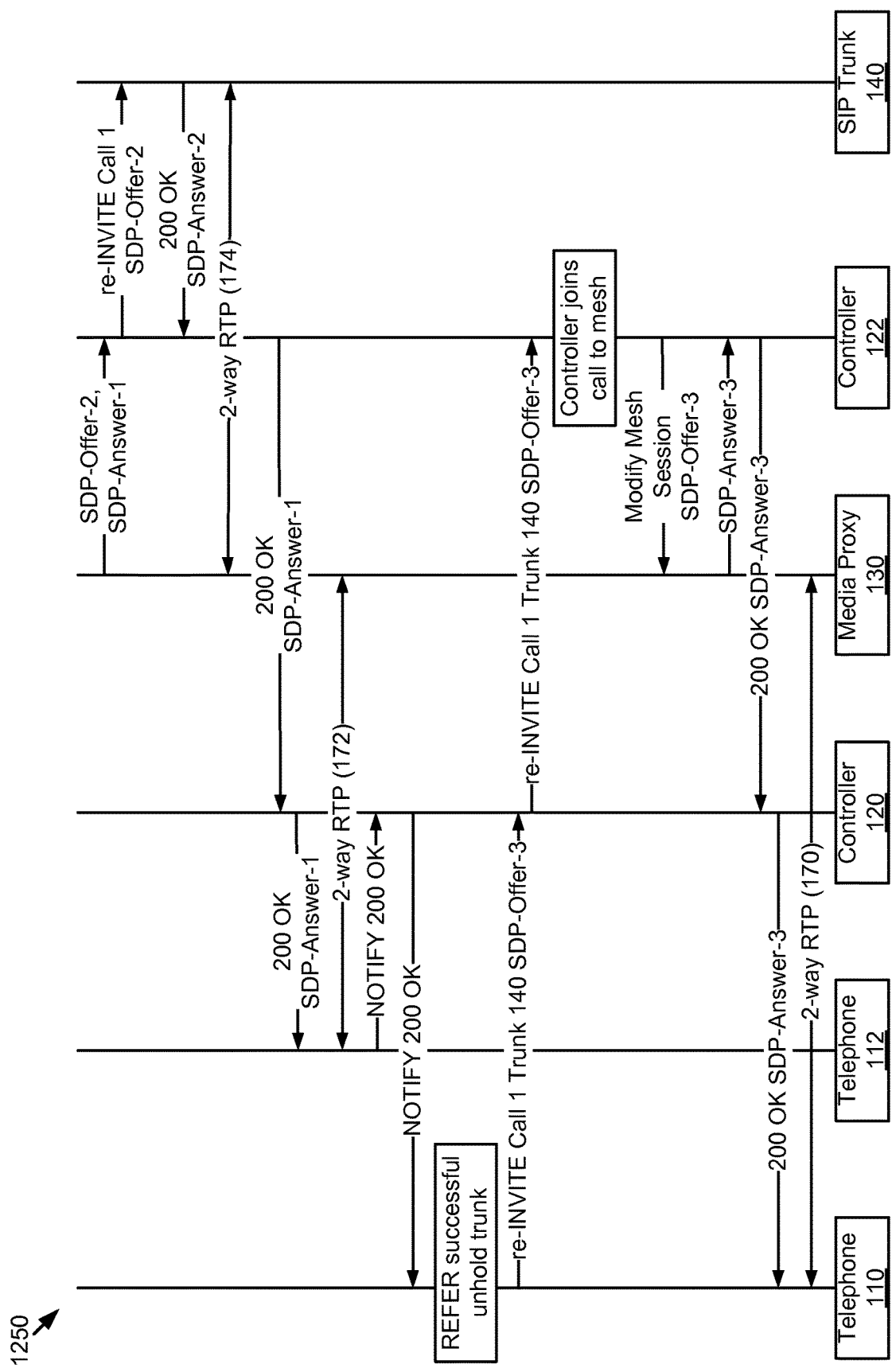
FIG. 12B is a use scenario or a continuing portion of the sequence diagram illustrating the example method for "meshing" a conference telephone call according to some embodiments of the VoIP systems.
Figure 12C:
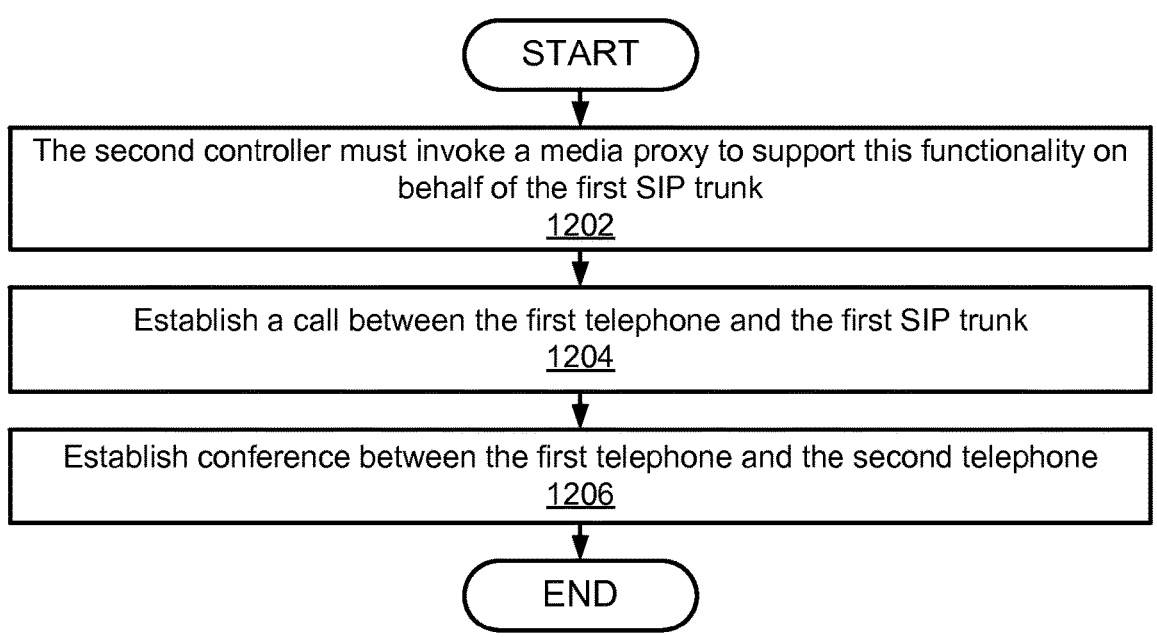
FIG. 12C is a flow chart illustrating an example method for establishing a conference mesh.

FIGS. 12A, 12B, and 12C illustrate a sequence diagram (in FIG. 12A and continuing in FIG. 12B) and a flow chart (in FIG. 12C) illustrating an example method for implementing a conference "mesh." FIGS. 12A and 12B illustrate two portions of an example of implementing a conference mesh. In particular, FIG. 12A indicates a first portion of a sequence diagram illustrating the manner by which a conference mesh may be implemented, for example, with telephones 110 and 112, controllers 120 and 122, with the media proxy 130 inserted between, and a SIP trunk 140. FIG. 12B indicates a second portion of the sequence diagram illustrating the manner by which a conference mesh may be implemented with telephones 110 and 112, the controller 120, media proxy 130, the controller 122, and the SIP trunk 140. It should be recognized that a mesh conference is one in which no one party is responsible for mixing media for another. That is, if parties A, B, and C are in a "mesh" conference, the party A streams to both parties B and C, the party B streams to both parties A and C, and party C streams to both parties A and B, and each party is responsible for mixing the media from the other two to present to the user. This method reduces the CPU requirements for the endpoints involved in the communication or call. It should also be recognized that a conference mesh is not a standard way of conferencing, and is not commonly supported by standard SIP compliant devices.

In this example of a call flow that is illustrated, telephone 110 and telephone 112 support the mesh conferencing model, but SIP trunk 140 does not. In such cases, the controller, in this case controller 120, for the SIP trunk 140 may invoke the media proxy 130 to support this functionality on behalf of the SIP trunk 140. The telephone 110 and the SIP trunk 140 may have a call established, and telephone 110 may conference in telephone 112. Some messages in the operations are omitted for brevity. Particular instance are illustrated where a "Call 1" is established between telephone 110 and SIP trunk 140 and put on hold. The telephone 110 initiates a consult call to telephone 112. The telephone 110 completes the conference. The controller 122 knows that the mesh is not supported on the trunk.

Referring now to FIG. 12C, in accordance with an example method for implementing a conference "mesh," the method begins at block 1202, where the second controller 122 invokes a media proxy 130 to support the functionality of mixing a conversation on behalf of the first SIP trunk 140. The method proceeds to the next block 1204, at which stage, a call is established between the first telephone 110 and the first SIP trunk 140. The method proceeds to the next block 1206, at which stage a conference is established between the first telephone 110 and the second telephone 112.

Figure 13A:
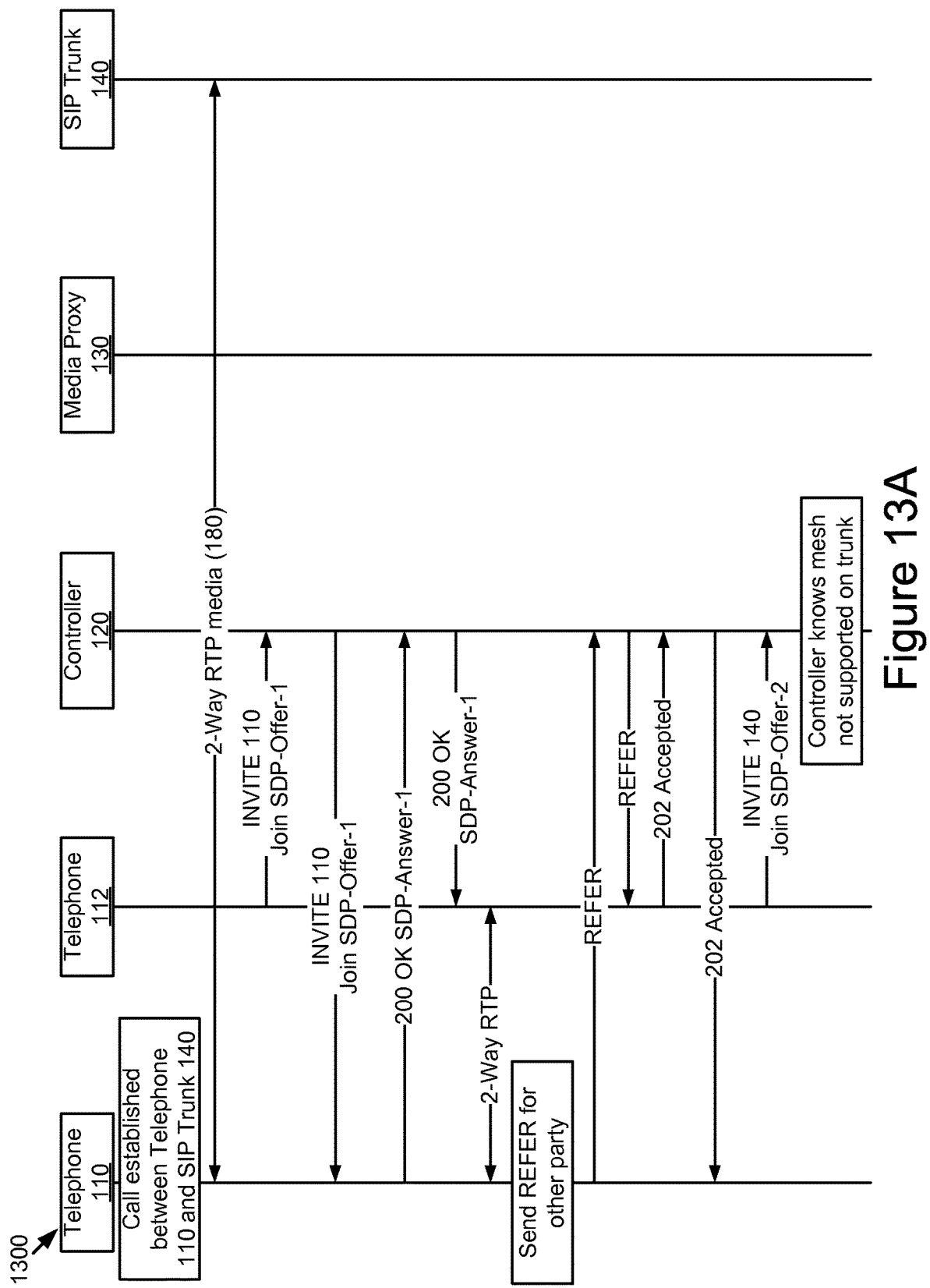
FIG. 13A is a use scenario or sequence diagram illustrating example operations for implementing features, for example, for "barging in," for "silent monitoring," and for "coaching" during conference telephone calls that are meshed according to some embodiments of the VoIP systems.
Figure 13B:
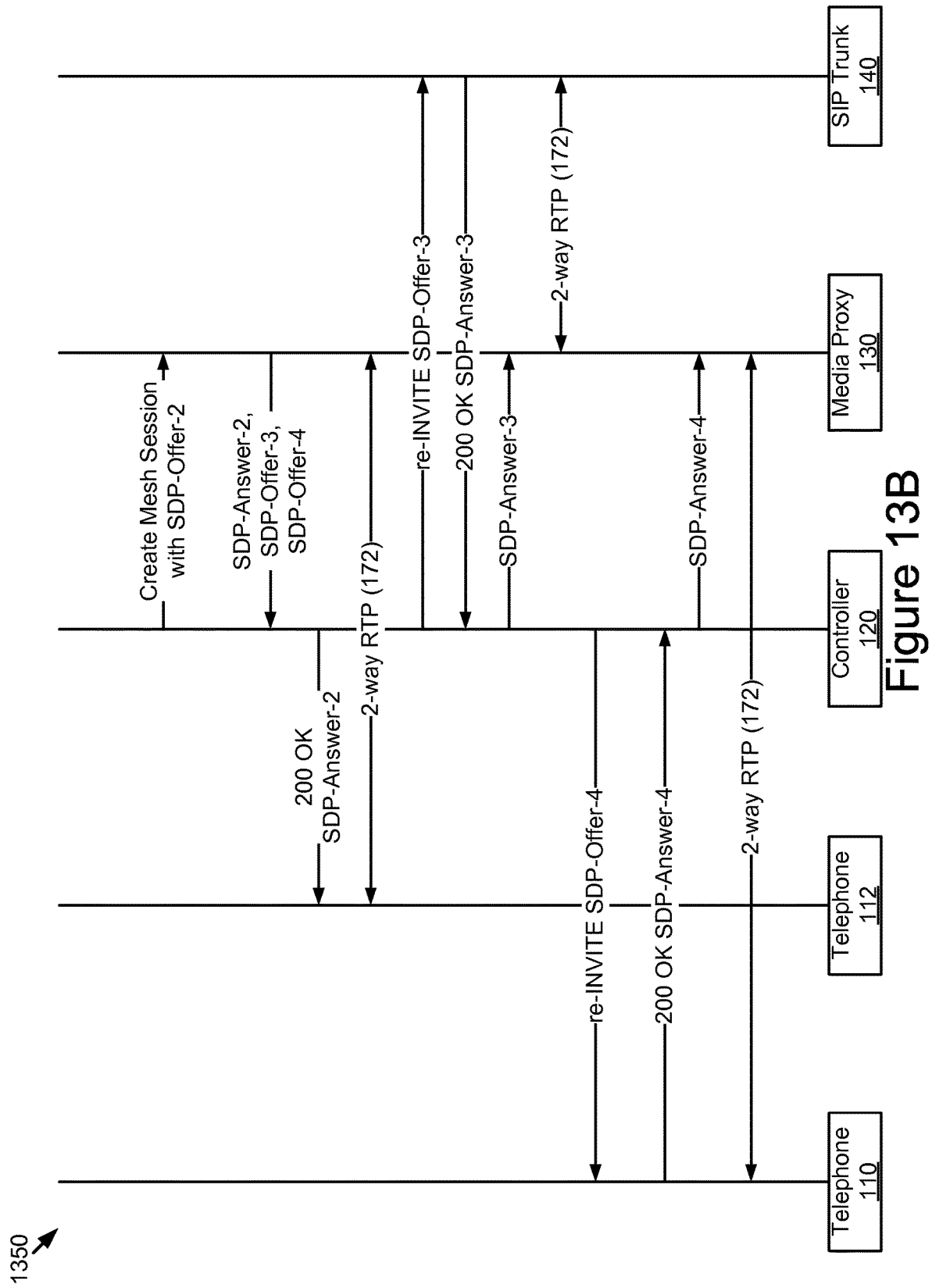
FIG. 13B is a use scenario or a continuing portion of the sequence diagram illustrating the example operations for "barging in," "silent monitoring," and "coaching" during conference telephone calls according to some embodiments of the VoIP systems.

FIG. 13A illustrates a sequence diagram to illustrate particular call features, for example, "barge in," "silent monitor," and "coach" features. These call features are illustrated generally by reference numeral 1300 and may be implemented during a conference "mesh." One of the advantages of a conference mesh is that participants may control which other parties can hear their voice. The sequence diagram 13A illustrates telephone 110 and 122, a controller 120, a media proxy 130, and a SIP trunk 140. Instances in the conference mesh process are indicated, for example, to illustrate that a call is established between the telephone 110 and the SIP trunk 140 and a telephone 112 joins the call. As the SIP trunk 140 does not support the conference mesh feature, the media is moved to the media proxy 130. An instance to send a "REFER" for the other party is illustrated. FIG. 13B is a continuation of the sequence diagram illustrated in 13A, with respect to the particular call features "barge in," "silent monitor," and "coach" features. In FIG. 13B, these call features are indicated generally by reference numeral 1350 and may be implemented during a conference "mesh."

Figure 13C:
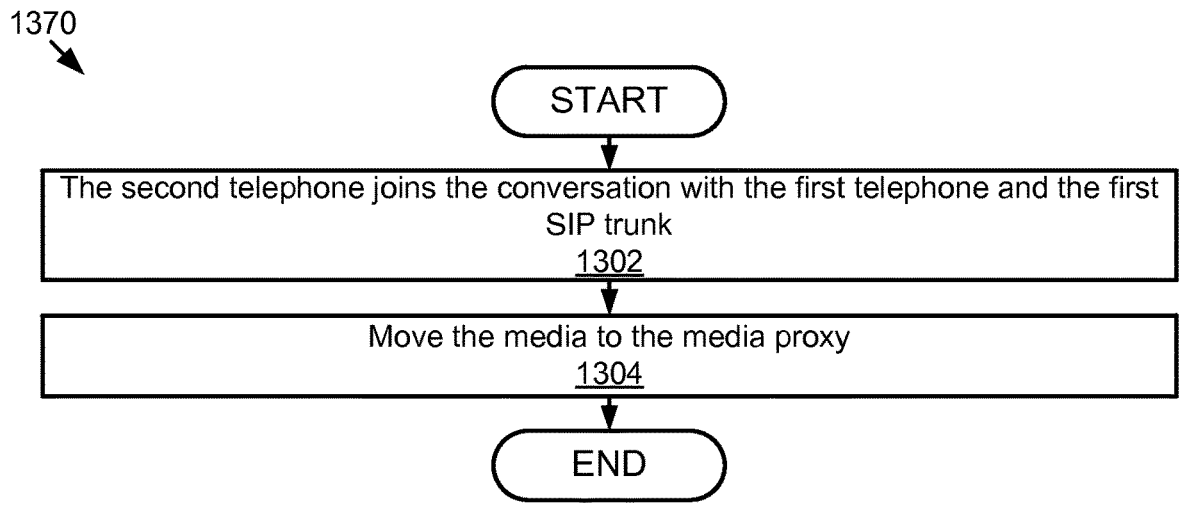
FIG. 13C is a flow chart illustrating an example method for implementing a "barge in" feature.

FIG. 13C illustrates an example method for implementing the "barge in" feature. The method begins at block 1302, where the second telephone 112 joins the conversation in progress, between the first telephone 110 and the first SIP trunk 140. The method proceeds to the next block of one or more operations, where the media is moved to the media proxy 130.

Figure 13D:
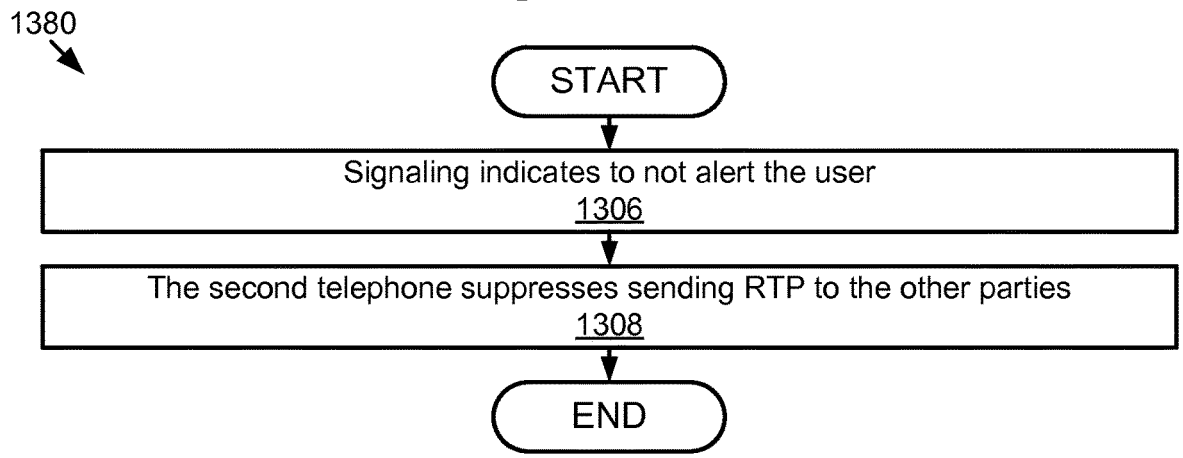
FIG. 13D is a flow chart illustrating an example method for implementing a "silent monitor" feature.

FIG. 13D illustrates an example method for implementing a "silent monitor" feature. With this particular feature, a telephone 112 decides to silently monitor a conversation. The signaling operations are identical to those performed for the "barge in" feature, except that, the signaling may indicate that the user should not be alerted. In this instance, the telephone 112 suppresses sending RTP to the other parties. As one example, the method begins at block 1306, at which point, signaling indicates not to alert the user. The method proceeds to the next block 1308, at which stage, one or more operations of the method suppress sending RTP to the other parties.

Figure 13E:
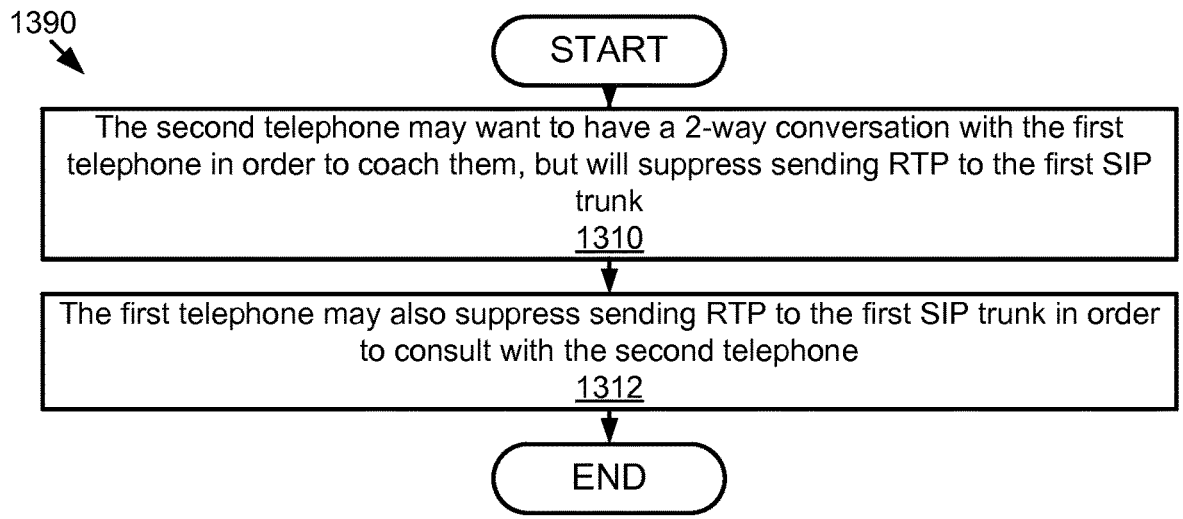
FIG. 13E is a flow chart illustrating an example method for implementing a "coaching" feature.

FIG. 13E illustrates an example method for implementing a "coach" feature for use with a conference mesh, for example, a user at telephone 112 may want to have a two-way conversation with telephone 110 in order to coach them. As one example, the method begins at block 1310, at which point, the second telephone may wish to have a 2-way conversation with the first telephone in order to coach them, but will suppress sending RTP to the first SIP trunk. The method proceeds to the next block 1312, at which stage, signaling indicates not to alert the user. The method proceeds to the next block 1308, at which stage, one or more operations of the method suppress sending RTP to the other parties.

Some Embodiments of VoIP Systems and Methods for Mesh Conferencing

Figure 14:
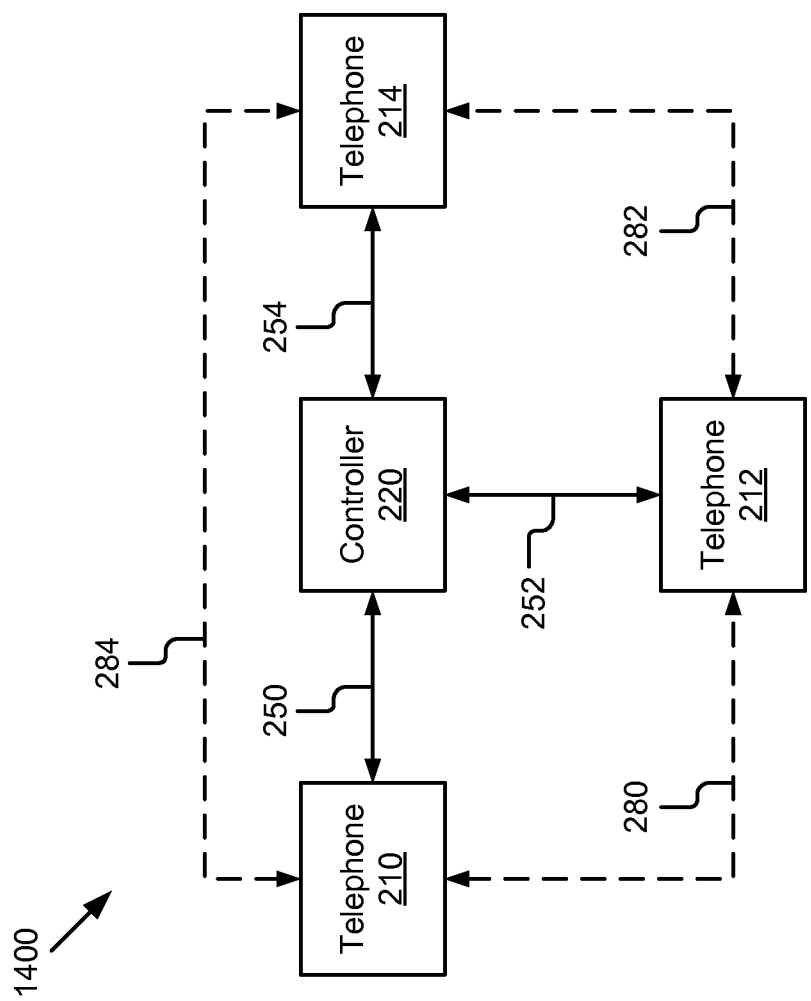
FIG. 14 is a high-level block diagram of a portion of a VoIP system that includes multiple telephones and at least one controller according to some embodiments.

FIG. 14 is a high-level block diagram illustrating a portion of a simplified VoIP system 1400 that includes multiple telephones and at least one controller according to some embodiments. This figure depicts some elements (components, functional modules, entities, and the like) involved in setting up and carrying out mesh conferences. Specifically, the elements that are shown here include telephones 210, 212, 214 and controller 220. These elements are illustrated by rectangular boxes or blocks. Although not specifically shown in this example, the system 1400 may also include one or more media proxies as described previously. Solid lines extending between the elements in FIG. 14 represent control (or signaling) paths (i.e., control paths 250, 252, 254). Dashed lines extending between the elements represent media (or content) paths (i.e., media paths 280, 282, 284). The "paths" may also be referred to as "links" or "streams." FIG. 14 provides a simplified architecture that is useful for describing mesh conferencing in accordance with some of the various embodiments. Other arrangements and/or groupings of the elements, as well as omission of some elements and/or inclusion of other elements, would be obvious to one of ordinary skill in the art based on the description provided herein.

The telephones 210, 212, 214 are examples of endpoints that may be used in some embodiments. The telephones 210, 212, 214 may be, for example, IP phones or soft phones. Other types of endpoints may be used in place of or in addition to one or more of the telephones. Examples of other types of endpoints include virtual phones, trunks (e.g., SIP trunks), button boxes, and the like.

The controller 220 may be used to control signaling for call setup and feature invocation in a manner similar to the controllers 120, 122 shown in FIGS. 1-4 and described above. The controller 220 may comprise a plurality of controllers distributed across the VoIP system 1400. The controller 220 may facilitate the exchange of messages (e.g., SIP signaling messages) between the telephones 210, 212, 214 for the setup of media communications. The media communications may include one or more of audio, video, web, or the like.

The communications may be established as a mesh conference. As described previously, a mesh conference is one in which no one party is responsible for mixing media for another party. That is, during a mesh conference, each of the telephones 210, 212, 214 may send media streams directly to and receive media streams directly from each of the other telephones 210, 212, 214. The media streams are received and mixed at each of the telephones for output at each of the telephones. For example, in some embodiments the telephone 210 may send separate media streams to the telephones 212, 214 (e.g., media streams 280, 284). Conversely, the telephone 210 may receive separate media streams from the telephones 212, 214 (e.g., media streams 280, 284). The media streams received at the telephone 210 may be mixed for output at the telephone 210. The telephones 212, 214 may send, receive, mix, and output media streams in a similar manner.

Figure 15A:
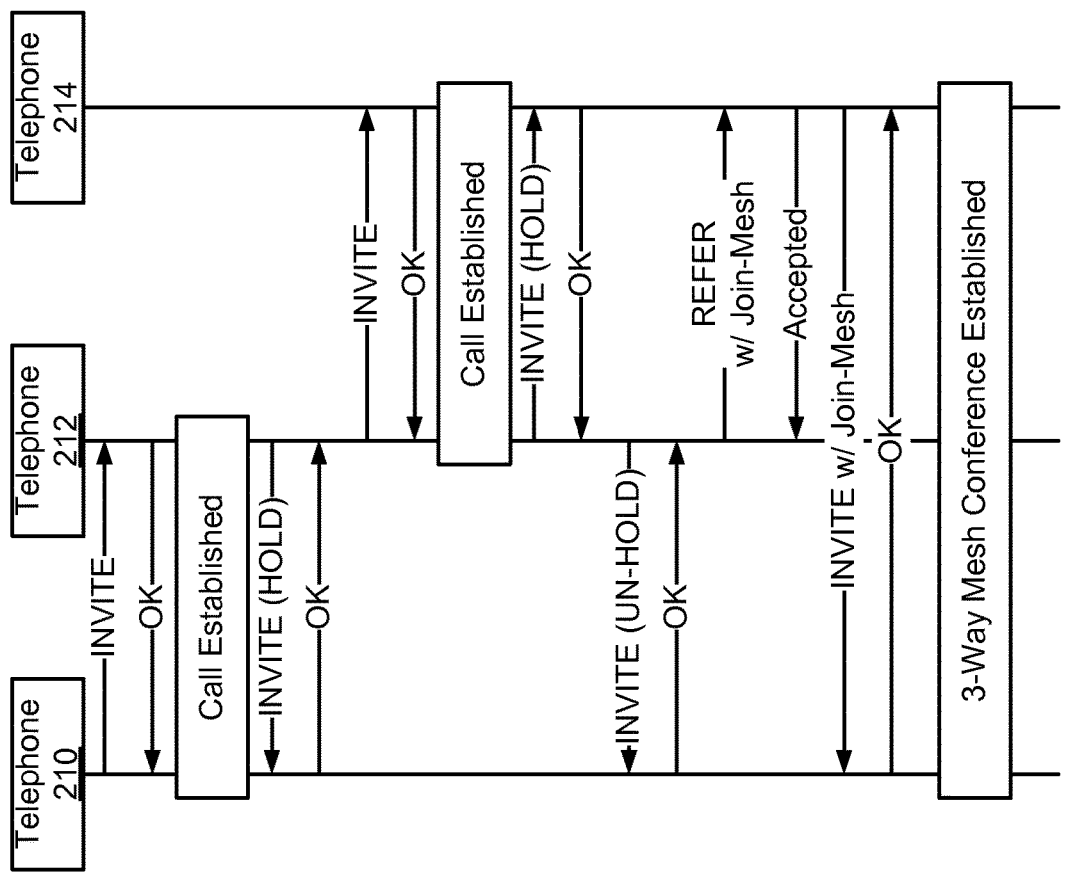
FIG. 15A is a use scenario or a portion of a sequence diagram for illustrating an exemplary method of establishing a mesh conference according to some embodiments.

FIG. 15A is a use scenario or a portion of a sequence diagram for illustrating an exemplary method of establishing a mesh conference according to some embodiments. FIG. 15A shows a part of the SIP signaling involved in establishing a mesh conference. The SIP messages are typically exchanged via one or more controllers as illustrated in the system 1400 shown in FIG. 14. These controllers are not critical to understanding the SIP signaling involved in the embodiments described herein and are thus omitted from this and other sequence diagrams. Further, some of the standard SIP signaling is omitted for clarity.

In the example illustrated in FIG. 15A, a first call is established between a telephone 210 and a telephone 212 using SIP signaling. The first call is put on hold, and a second call is established between the telephone 212 and a telephone 214 using SIP signaling. The first call between the telephone 210 and the telephone 212 is released from hold, and the telephone 212 sends a SIP REFER message to the telephone 214. The SIP REFER message includes Join and Mesh parameters. The Join parameter may be used to transfer the second call into a conference, and the Mesh parameter may be used to indicate that the conference will follow a mesh flow. This may entail keeping a media path associated with the second call between the telephone 212 and telephone 214 (rather than tearing it down). Further, this may also entail establishing a media path between the telephone 214 and the telephone 210. This media path may be established by sending a SIP INVITE message with Join and Mesh parameters from the telephone 214 to telephone 210. The mesh conference is established with media paths between each of the telephones 210, 212, 214.

Figure 15B:
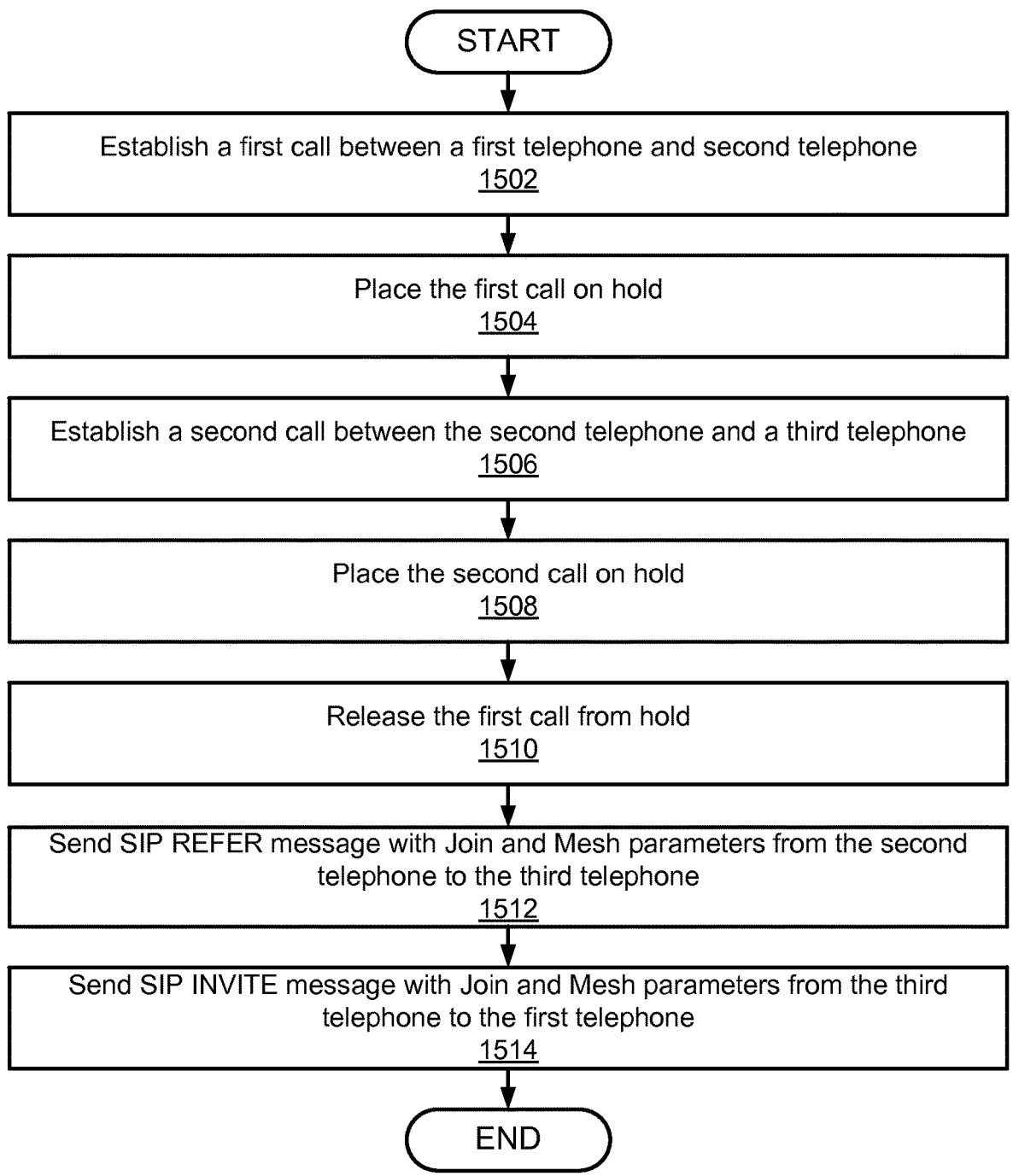
FIG. 15B is a flow chart illustrating an exemplary method for establishing a mesh conference according to some embodiments.

Merely by way of example, a header of the SIP REFER message sent from the telephone 212 to the telephone 214 may be formatted similar to the following:

Refer-To: "John Doe" <sips:1118@10.57.3.39?Join=67b8db8-0-13c4-6006-14b777-18e83cf4-14b777%3to-tag%3d6801208-0-13c4-6006-14b777-596e5d2-14b777%3bfrom-tag%3d1706944706%3bmesh> and a header of the SIP INVITE message sent from the telephone 214 to the telephone 210 may be formatted similar to the following:

Join: 67b8db8-0-13c4-6006-14b777-18e83cf4-14b777;to-tag=6801208-0-13c4-6006-14b777-596e5d2-14b777;from-tag=1706944706;mesh FIG. 15B is a flow chart illustrating an exemplary method for establishing a mesh conference according to some embodiments. The method begins at block 1502, where a first call is established between a first telephone and a second telephone using SIP signaling. The first call is placed on hold at block 1504. The method proceeds to block 1506, at which stage a second call is established between the second telephone and a third telephone using SIP signaling. The second call is placed on hold at block 1508, and the first call is released from hold at block 1510. The method proceeds to block 1512, at which stage a SIP REFER message with Join and Mesh parameters is sent from the second telephone to the third telephone. At block 1514, a SIP INVITE message with Join and Mesh parameters is sent from the third telephone to the first telephone.

In some embodiments, the methods described with regard to FIGS. 15A-15B may be used to establish a conference between users of telephones 210, 212, 214 using a mesh flow. If one or more additional users join the conference, a centralized conference may be automatically established using a facilitator such as a conference bridge. As the number of participants in a conference increases, it may be more efficient to transition from the mesh conference to the centralized conference.

Figure 16:
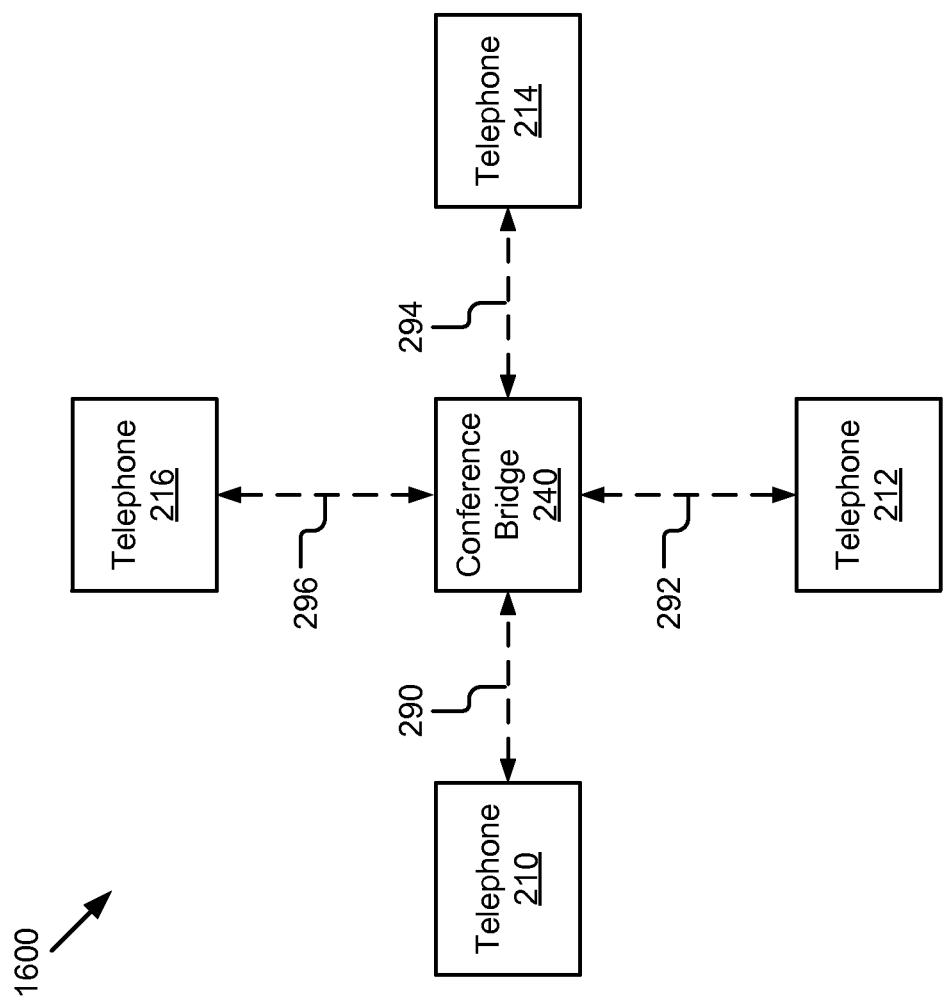
FIG. 16 is a high-level block diagram of a portion of a VoIP system that includes multiple telephones and at least one conference bridge according to some embodiments.

FIG. 16 provides an exemplary architecture for illustrating centralized conferencing according to some embodiments. This figure is a high-level block diagram of a portion of a simplified VoIP system 1600 that includes multiple telephones and at least one conference bridge. Dashed lines extending between the elements represent media (or content) paths (i.e., media paths 290, 292, 294, 296). The system 1600 provides an exemplary architecture for illustrating centralized conferencing according to some embodiments. Like the other figures in this application, FIG. 16 has been simplified to avoid unnecessary clutter. It should be appreciated that the system 1600 may include one or more controllers that communicate with the telephones 210, 212, 214, 216 using signaling paths (also not shown) as illustrated in FIG. 14. Similarly, the system 1400 shown in FIG. 14 may include one or more conference bridges although not specifically shown or described in the examples provided herein.

Assume, for the purposes of the example illustrated in FIG. 16, that a user of the telephone 216 joins a mesh conference that is already in progress between the telephones 210, 212, 214. When the telephone 216 joins the conference, the mesh conference may be automatically transitioned to a centralized conference where each telephone sends a media stream to the conference bridge 240 (in contrast to the mesh conference where separate media streams are sent from each telephone to each of the other telephones). The media streams are mixed at the conference bridge 240, and a mixed media stream is sent from the conference bridge 240 to each telephone. For example, in some embodiments the telephone 210 may send a media stream to the conference bridge 240 and receive a mixed media stream from the conference bridge 240. Both media streams (to and from the conference bridge) are represented by media stream 290. The mixed media stream received from the conference bridge may include media streams from each of the telephones 212, 214, 216. In a similar manner, each of the telephones 212, 214, 216 may send a media stream to the conference bridge and receive a mixed media stream from the conference bridge 240. The media streams (to and from the conference bridge) are represented by media streams 292, 294, 296 respectively. The mixed media streams received from the conference bridge include media streams from each of the other telephones (e.g., the mixed media stream received at telephone 212 includes media streams from telephones 210, 214, 216; the mixed media stream received at telephone 214 includes media streams from telephones 210, 212, 216; and the mixed media stream received at telephone 216 includes media streams from telephones 210, 212, 214).

Figure 17:
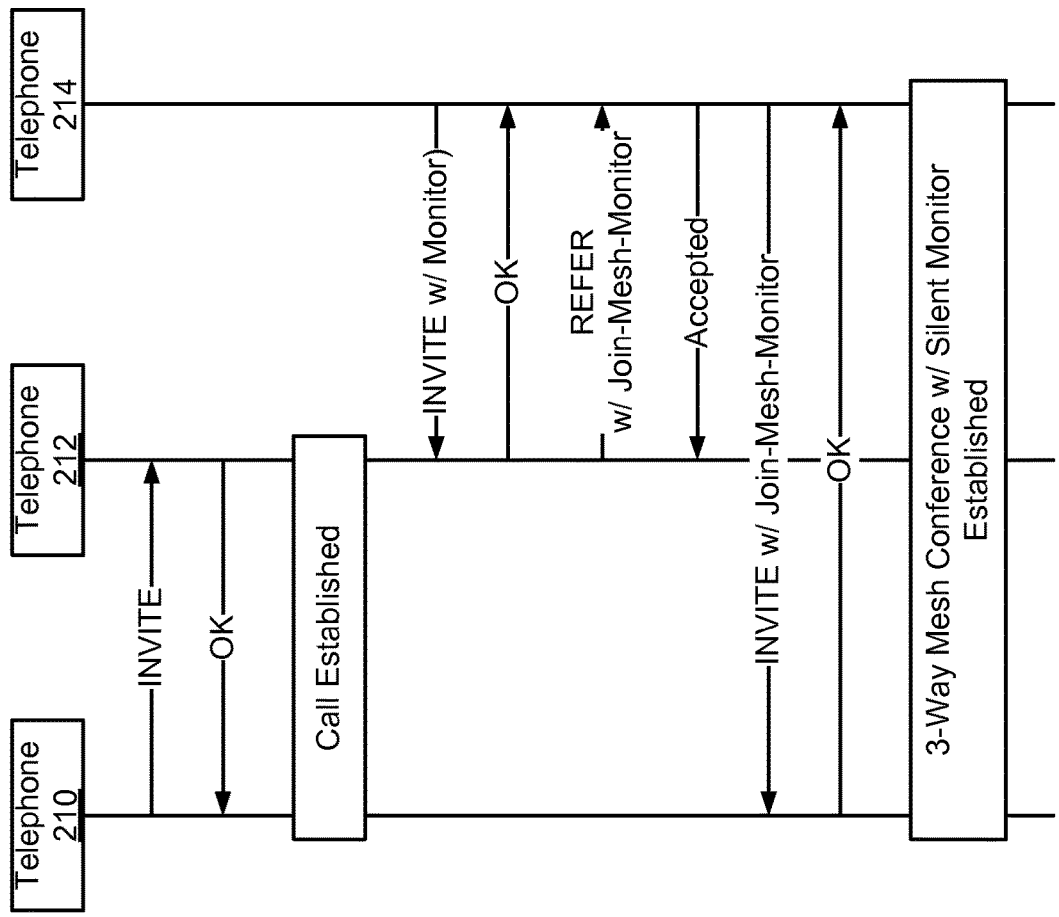
FIG. 17 is a use scenario or a portion of a sequence diagram illustrating exemplary operations for implementing "silent monitoring" during conference telephone calls that are meshed according to some embodiments.

Methods similar to those described above with regard to FIGS. 15A-15B may be used to establish mesh conferences utilizing other call features such as "silent monitor," "coach," and "barge in" features. FIG. 17 is a use scenario or a portion of a sequence diagram illustrating exemplary operations for implementing "silent monitoring" during conference telephone calls that are meshed according to some embodiments. Like FIG. 15A, FIG. 17 shows a part of the SIP signaling involved in establishing a mesh conference that in this case utilizes a "silent monitor" call feature.

In this example, a first call is established between a telephone 210 and a telephone 212 using SIP signaling. A user of telephone 214 wishes to silently monitor the call between the telephone 210 and the telephone 212. To implement the "silent monitor" call feature, a SIP INVITE message with a Monitor parameter is sent from the telephone 214 to the telephone 212. The Monitor parameter may be used to indicate that the telephone 214 wishes to silently monitor the call between the telephone 210 and the telephone 212. A SIP REFER message with Join, Mesh, and Monitor parameters is sent from the telephone 212 to the telephone 214. A SIP INVITE message with Join, Mesh, and Monitor parameters is sent from the telephone 214 to the telephone 210. The mesh conference with "silent monitoring" is established with media paths between each of the telephones 210, 212, 214.

Since the telephone 214 is a silent monitor of the media communications, the telephone 214 may receive media streams from each of the other telephones 210, 212 but may not provide media streams to either of the other telephones 210, 212. Thus, the telephone 210 may receive a media stream from the telephone 212 for output at the telephone 210; the telephone 212 may receive a media stream from the telephone 210 for output at the telephone 210; and the telephone 214 may receive media streams from the telephones 210, 212. The media streams from the telephones 210, 212 may be mixed and output at the telephone 214.

Figure 18:
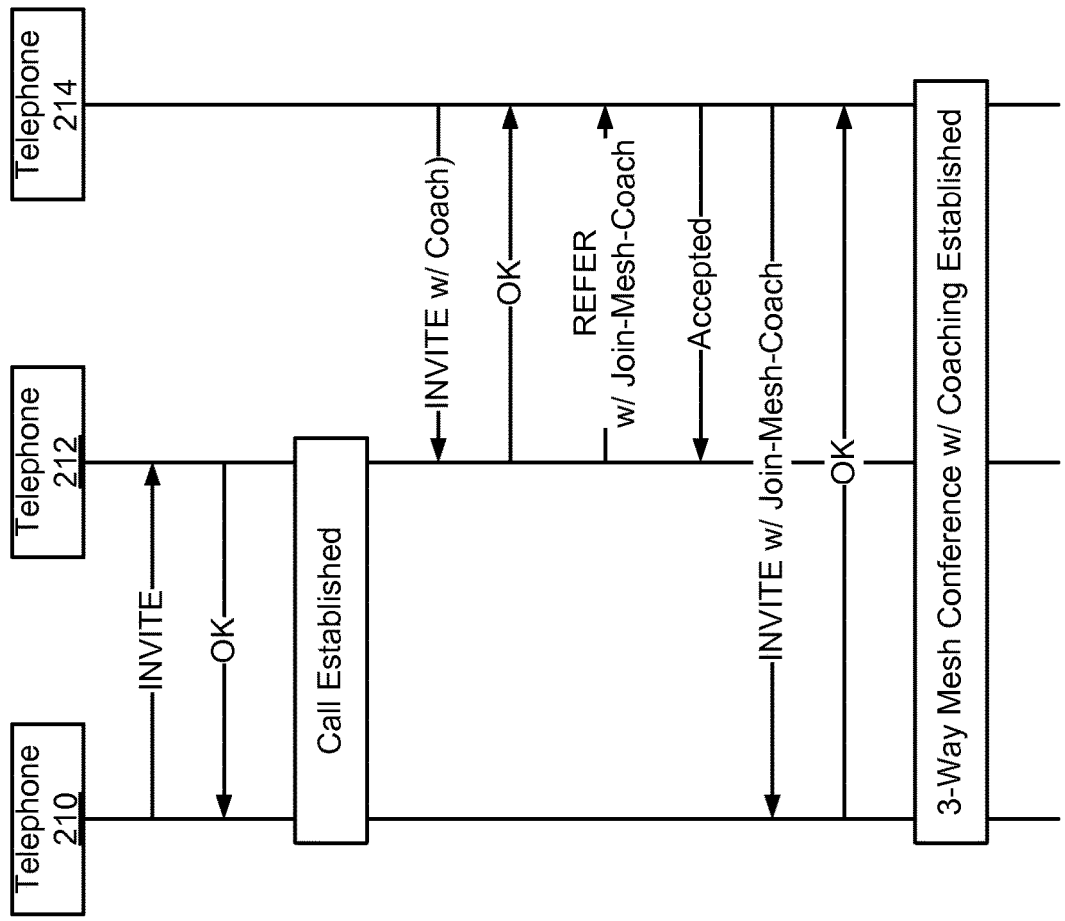
FIG. 18 is a use scenario or a portion of a sequence diagram illustrating exemplary operations for implementing "coaching" during conference telephone calls that are meshed according to some embodiments.
Figure 19:
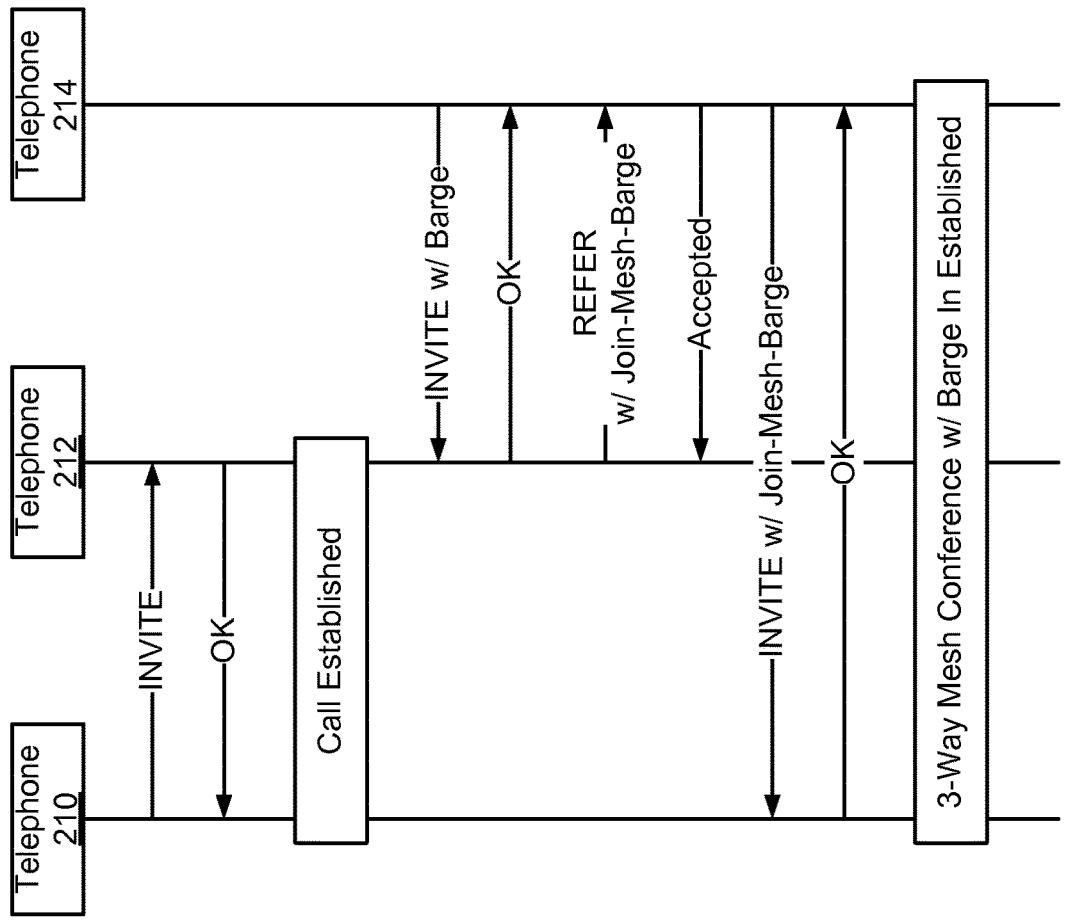
FIG. 19 is a use scenario or a portion of a sequence diagram illustrating exemplary operations for implementing "barging in" during conference telephone calls that are meshed according to some embodiments.

FIGS. 18-19 are similar to FIG. 17 except that they illustrate exemplary operations for implementing "coaching" and "barging in" features respectively. These methods are similar to that of FIG. 17 except the Monitor parameter is replaced by a Coach parameter in the example shown in FIG. 18 and a Barge parameter in the example shown in FIG. 19.

In FIG. 18, the Coach parameter may be used to indicate that the telephone 214 wishes to coach (or communicate with) the user of the telephone 212 without being heard by the user of the telephone 210. Thus, a mesh conference with "coaching" is established with media paths between each of the telephones 210, 212, 214. In this scenario, the telephone 210 may receive a media stream from the telephone 212 for output at the telephone 210; the telephone 212 may receive media streams from the telephones 210, 214 for mixing and output at the telephone 210; and the telephone 214 may receive media streams from the telephones 210, 212 for mixing and output at the telephone 214.

In FIG. 19, the Barge parameter may be used to indicate that the telephone 214 wishes to join an existing call between the telephone 210 and the telephone 212. Thus, a mesh conference with "barge in" is established with media paths between each of the telephones 210, 212, 214. In this scenario, the telephone 210 may receive media stream from the telephones 212, 214 for mixing and output at the telephone 210; the telephone 212 may receive media streams from the telephones 210, 214 for mixing and output at the telephone 210; and the telephone 214 may receive media streams from the telephones 210, 212 for mixing and output at the telephone 214.

It should be recognized that the foregoing description of the various embodiments of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the telecommunications art, the present technology may be embodied in other specific forms, without departing from the spirit or essential characteristics thereof. Likewise, the particular naming and division of the blocks, routines, features, attributes, methodologies, and other aspects are not mandatory or significant, and the mechanisms that implement the present disclosure or its features may have different names, divisions and/or formats. Furthermore, as should be apparent to one of ordinary skill in the relevant art, the blocks, routines, features, attributes, methodologies and other aspects of the present technology can be implemented as software, hardware, firmware, or any combination of the three. Also, wherever a component, an example of which is illustrated by a block, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming in the telecommunications area. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A system for conferencing comprising:
   at least three endpoints communicatively coupled to each other via media paths, the media paths for exchanging media communications for a conference between the at least three endpoints;
   wherein the conference results from one of the at least three endpoints barging in on an existing telephone call between other endpoints of the at least three endpoints using SIP signaling by:
      sending a SIP INVITE message with a Barge parameter from the third endpoint to the second endpoint;
      sending a SIP REFER message with a Join parameter, a Mesh parameter, and the Barge parameter from the second endpoint to the third endpoint; and
      sending a SIP INVITE message with the Join parameter, the Mesh parameter, and the Barge parameter from the third endpoint to the first endpoint.

2. The system according to claim 1 wherein during the mesh conference:
   the first endpoint receives separate media streams from the second endpoint and the third endpoint and mixes the media streams for output at the first endpoint,
   the second endpoint receives separate media streams from the first endpoint and the third endpoint and mixes the media streams for output at the second endpoint, and
   the third endpoint receives separate media streams from the first endpoint and the second endpoint and mixes the media streams for output at the third endpoint.

3. The system according to claim 1 wherein at least one of the at least three endpoints is a telephone.

4. The system according to claim 1 wherein the at least three endpoints are exactly three endpoints.

5. The system according to claim 1 wherein the media communications between the at least three endpoints include at least one of audio or video communications.

6. A method for establishing a mesh conference using Session Initiation Protocol (SIP) signaling, comprising:
   establishing the mesh conference between a first endpoint, a second endpoint, and a third endpoint using SIP signaling, wherein during the mesh conference:
      the first endpoint receives separate media streams from the second endpoint and the third endpoint and mixes the media streams for output at the first endpoint,
      the second endpoint receives separate media streams from the first endpoint and the third endpoint and mixes the media streams for output at the second endpoint, and
      the third endpoint receives separate media streams from the first endpoint and the second endpoint and mixes the media streams for output at the third endpoint;
   wherein the mesh conference results from the third endpoint using the SIP signaling to barge in on an existing telephone call between the second endpoint and the first endpoint; and
   wherein the establishing of the mesh conference between the first endpoint, the second endpoint, and the third endpoint further comprises:
      sending a SIP INVITE message with a Barge parameter from the third endpoint to the second endpoint;
      sending a SIP REFER message with a Join parameter, a Mesh parameter, and the Barge parameter from the second endpoint to the third endpoint; and
      sending a SIP INVITE message with the Join parameter, the Mesh parameter, and the Barge parameter from the third endpoint to the first endpoint.

7. The method according to claim 6 wherein the media streams include at least one of audio or video communications.

8. A method for establishing a conference using Session Initiation Protocol (SIP) signaling, comprising:
   establishing a mesh conference between a first endpoint, a second endpoint, and a third endpoint using SIP signaling, wherein during the mesh conference:
      the first endpoint receives separate media streams from the second endpoint and the third endpoint and mixes the media streams for output at the first endpoint,
      the second endpoint receives separate media streams from the first endpoint and the third endpoint and mixes the media streams for output at the second endpoint, and
      the third endpoint receives separate media streams from the first endpoint and the second endpoint and mixes the media streams for output at the third endpoint; and
   after establishing the mesh conference between the first endpoint, the second endpoint, and the third endpoint using the SIP signaling, sending a SIP INVITE message from one of the first endpoint, the second endpoint, and the third endpoint to a fourth endpoint to establish a 4-way conference, wherein during the 4-way conference:
  the first endpoint sends a media stream to a conference bridge and receives a first mixed media stream from the conference bridge, the first mixed media stream including media streams from the second endpoint, the third endpoint, and the fourth endpoint,
  the second endpoint sends a media stream to the conference bridge and receives a second mixed media stream from the conference bridge, the second mixed media stream including media streams from the first endpoint, the third endpoint, and the fourth endpoint,
  the third endpoint sends a media stream to the conference bridge and receives a third mixed media stream from the conference bridge, the third mixed media stream including media streams from the first endpoint, the second endpoint, and the fourth endpoint, and
  the fourth endpoint sends a media stream to the conference bridge and receives a fourth mixed media stream from the conference bridge, the fourth mixed media stream including media streams from the first endpoint, the second endpoint, and the third endpoint.

9. The method according to claim 8 wherein:
the establishing of the mesh conference results from at least one of the first endpoint, the second endpoint, and the third endpoint using the SIP signaling to barge in on an existing telephone call between the other endpoints of the first endpoint, the second endpoint, and the third endpoint.

10. The method according to claim 8 wherein:
the establishing of the mesh conference between the first endpoint, the second endpoint, and the third endpoint further comprises:
  establishing a first call between the first endpoint and the second endpoint using the SIP signaling;
  placing the first call on hold using the SIP signaling;
  establishing a second call between the second endpoint and the third endpoint using the SIP signaling;
  placing the second call on hold;
  releasing the first call from hold;
  sending a SIP REFER message with a Join parameter and a Mesh parameter from the second endpoint to the third endpoint; and
  sending a SIP INVITE message with the Join parameter and the Mesh parameter from the third endpoint to the first endpoint.

11. The method according to claim 8 wherein at least one of the first endpoint, the second endpoint, the third endpoint, and the fourth endpoint is a telephone.

12. The method according to claim 8 wherein the first endpoint, the second endpoint, the third endpoint, and the fourth endpoint are telephones.

* * * * *